US012363466B2

(12) United States Patent
Lorenzen

(10) Patent No.: US 12,363,466 B2
(45) Date of Patent: Jul. 15, 2025

(54) SELF-POWERED MOUNTABLE SPEAKER BAR

(71) Applicant: Sound Extreme Inc, Cypress, TX (US)

(72) Inventor: Jonathan Lorenzen, San Diego, CA (US)

(73) Assignee: Sound Extreme Inc., Cypress, TX (US)

( * ) Notice: Subject to any disclaimer, the term of this patent is extended or adjusted under 35 U.S.C. 154(b) by 0 days.

(21) Appl. No.: 18/584,651

(22) Filed: Feb. 22, 2024

(65) Prior Publication Data

US 2024/0196122 A1 Jun. 13, 2024

Related U.S. Application Data

(63) Continuation of application No. 17/184,008, filed on Feb. 24, 2021, now Pat. No. 11,917,349, which is a continuation-in-part of application No. 29/748,613, filed on Aug. 31, 2020, now Pat. No. Des. 985,534, and a continuation-in-part of application No.
(Continued)

(51) Int. Cl.
*H04R 1/02* (2006.01)

(52) U.S. Cl.
CPC ............. *H04R 1/023* (2013.01); *H04R 1/025* (2013.01); *H04R 1/026* (2013.01); *H04R 2420/07* (2013.01)

(58) Field of Classification Search
CPC ........ H04R 1/023; H04R 1/025; H04R 1/026; H04R 2420/07
See application file for complete search history.

(56) References Cited

U.S. PATENT DOCUMENTS 4,168,762 A 9/1979 Griffin, Jr.
D302,818 S 8/1989 Camens
(Continued)

FOREIGN PATENT DOCUMENTS

CN 306161818 11/2020
EM 00516745-0001 4/2006
(Continued)

OTHER PUBLICATIONS

310Audio, Rechargeable Bazooka Speaker With Bluetooth and Sound Activated Lights.
(Continued)

*Primary Examiner* — Forrest M Phillips
(74) *Attorney, Agent, or Firm* — Genius Patent APC; Bruce Angus Hare

(57) ABSTRACT

A self-powered mountable speaker bar may include a rechargeable battery and a set of mounting features for use during recreational activities such as powersports, boating, and off-roading. The self-powered mountable speaker bar may include a housing and a set of mounting features that allow the housing to be securely coupled to a vehicle component or other appropriate support. The rechargeable battery may be removeable and may include a set of coupling features such as spring-loaded tabs associated with complementary features of the housing, such as slots. The self-powered mountable speaker bar may include a wireless communication module that interacts with user devices such as smartphones. The housing may be waterproof, dustproof, and/or shock-proof.

13 Claims, 24 Drawing Sheets

Related U.S. Application Data

29/748,608, filed on Aug. 31, 2020, now Pat. No. Des. 937,244.

(56) References Cited

U.S. PATENT DOCUMENTS

| | | | | |
|---|---|---|---|---|
| D317,768 | S | 6/1991 | Davidson | |
| D328,901 | S | 8/1992 | Haruyama | |
| 5,191,177 | A | 3/1993 | Chi | |
| D384,350 | S | 9/1997 | Nuevo et al. | |
| D392,640 | S | 3/1998 | Tully et al. | |
| D415,162 | S | 10/1999 | Chen | |
| D443,262 | S | 6/2001 | Caren | |
| D525,238 | S | 7/2006 | Hannapel | |
| D551,656 | S | 9/2007 | Ritsher et al. | |
| D553,121 | S | 10/2007 | Gondo et al. | |
| D555,636 | S | 11/2007 | Chen et al. | |
| D571,359 | S | 6/2008 | Chang | |
| D585,882 | S | 2/2009 | Lum et al. | |
| D676,418 | S | 2/2013 | Suzuki | |
| D677,244 | S | 3/2013 | Funayama | |
| D694,215 | S | 11/2013 | Birger | |
| D716,265 | S | 10/2014 | Park et al. | |
| D742,358 | S | 11/2015 | Alves et al. | |
| D758,336 | S | 6/2016 | Kelly et al. | |
| D765,618 | S | 9/2016 | Alves et al. | |
| D772,092 | S | 11/2016 | Hageman et al. | |
| D772,094 | S | 11/2016 | Kruska et al. | |
| D848,397 | S | 5/2019 | Alves et al. | |
| D868,033 | S | 11/2019 | Luo | |
| 10,471,903 | B1 * | 11/2019 | Jordan | H04R 1/403 |
| D876,395 | S | 2/2020 | Kung | |
| D879,738 | S | 3/2020 | Guo | |
| D889,443 | S | 7/2020 | Renwick | |
| D892,762 | S | 8/2020 | Yang | |
| D893,455 | S | 8/2020 | Winton et al. | |
| D893,459 | S | 8/2020 | Lum et al. | |
| D937,244 | S | 11/2021 | Lorenzen | |
| D941,271 | S | 1/2022 | Ray et al. | |
| 11,285,885 | B1 | 3/2022 | Jordan | |
| D985,534 | S | 5/2023 | Lorenzen | |
| 11,745,669 | B1 * | 9/2023 | Jordan | H04R 1/026<br>381/389 |
| 11,917,349 | B2 * | 2/2024 | Lorenzen | H04R 1/026 |
| 12,054,102 | B1 * | 8/2024 | Jordan | F21V 33/0056 |
| 2006/0079105 | A1 * | 4/2006 | Chintala | H04M 1/026<br>439/76.1 |
| 2014/0355806 | A1 * | 12/2014 | Graff | H04R 1/2834<br>381/334 |
| 2016/0198247 | A1 | 7/2016 | Cheney et al. | |
| 2016/0345086 | A1 | 11/2016 | Chamberlin et al. | |
| 2017/0021776 | A1 * | 1/2017 | White | H04R 1/403 |
| 2017/0026725 | A1 * | 1/2017 | White | H04R 1/403 |
| 2017/0325010 | A1 | 11/2017 | Kung | |
| 2023/0239603 | A1 | 7/2023 | Ohori et al. | |

FOREIGN PATENT DOCUMENTS

| | | |
|---|---|---|
| EM | 002160093-0001 | 12/2012 |
| EM | 004536399-0001 | 12/2017 |
| EM | 005328598-0003 | 6/2018 |
| EM | 006624086-0001 | 7/2019 |
| EM | 007075163-0006 | 10/2019 |
| EM | 008039853-0006 | 7/2020 |

OTHER PUBLICATIONS

Bosbos, Cannon Wireless Speaker.

Crutchfield, Bazooka BPB24-DS-G2 Party Bar.

Ecobouldermax Jan. 15, 2021 ecoxgear.com/collections/party-speakers/products/ecoboulder-max.

Ecoxgear Bluetooth Speaker at Grace Digital Inc Jan. 15, 2021 www.groupon.com/deal/grace-digital-inc.

Ecoxgear Ecobouldermax Jul. 4, 2020 www.amazon.com Ecoboulder Waterproof Floating Bluetooth.

Ele Eleoption, 16W Portable Column Bluetooth Speaker Move KTV 3D Sound System Sound Bar Subwoofer Music Wireless Speaker FM Radio USB—United States—Black.

ET, Wireless Bluetooth Speaker,Outdoor Stereo Speaker Bass Sound With Power Bank Bluetooth 4.2 Stereo Subwoofer Portable Speakers With FM Radio and TF Card Slot.

* cited by examiner

SELF-POWERED MOUNTABLE SPEAKER BAR

CROSS-REFERENCE TO RELATED APPLICATIONS

This application is a continuation of U.S. patent application Ser. No. 17/184,008, filed on Feb. 24, 2021. U.S. patent application Ser. No. 17/184,008 is a continuation-in-part of U.S. Design patent application Ser. No. 29/748,608 filed on Aug. 31, 2020. U.S. patent application Ser. No. 17/184,008 is a continuation-in-part of U.S. Design patent application Ser. No. 29/748,613, filed on Aug. 31, 2020.

BACKGROUND OF THE INVENTION

Many consumers wish to utilize audio or other multimedia devices while engaging in recreational activities such as powersports, boating, off-roading, etc. Available media players typically draw power from a vehicle battery, requiring hard-wired connections and conscientious management of battery loading and charge.

Therefore, there exists a need for a powersports audio system for use during such recreational activities that eliminates the need to draw power from the vehicle battery and allows for simple installation that does not require integration with external power systems.

BRIEF DESCRIPTION OF DRAWINGS

The novel features of the disclosure are set forth in the appended claims. However, for purposes of explanation, several embodiments are illustrated in the following drawings.

DETAILED DESCRIPTION OF THE INVENTION

Figure 1:
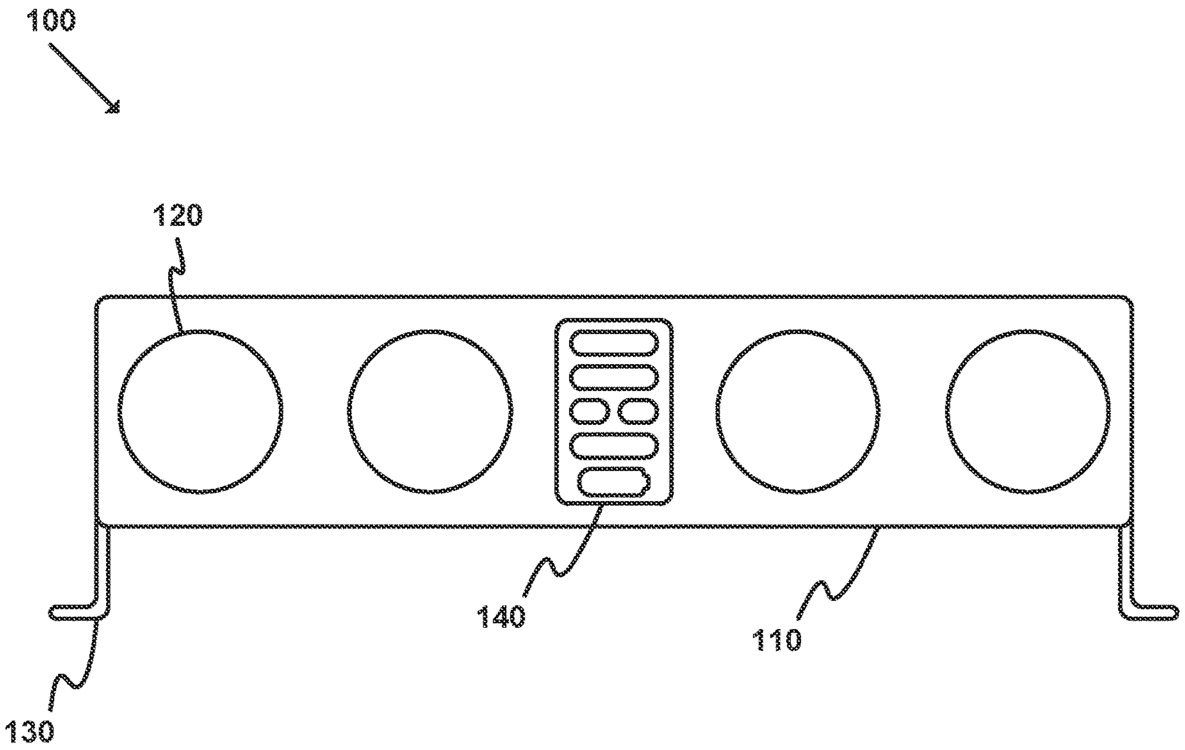
FIG. 1 illustrates a front elevation view of a self-powered mountable speaker bar according to an exemplary embodiment of the invention.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a self-powered mountable speaker bar (also referred to as a "playback device" or "media playback device").

The playback device may be able to connect to one or more user devices (e.g., a smartphone, wearable device, PC, tablet, etc.) such that the playback device may receive data associated with multimedia content and generate outputs (e.g., audible sound, video, etc.) associated with the content.

Although various examples provided below may include or reference audio content, one of ordinary skill will recognize that other types of multimedia content (e.g., video content, audio-visual content, graphics, etc.) may be provided by some embodiments. Similarly, although inputs such as microphones may be discussed in reference to specific examples, some embodiments may include other types of inputs (e.g., still and/or video cameras, motion and/or position sensing elements, etc.). Likewise, various examples may refer to speakers as outputs, but some embodiments may include other types of outputs (e.g., video displays, haptic feedback outputs such as vibration, etc.).

The playback device may be capable of operating at different power levels (e.g., a "low" output level for stationary use, a "high" output level that emits enough volume to be heard above a running vehicle, etc.).

The self-powered mountable speaker bar may include a rechargeable battery pack that allows the self-powered mountable speaker bar to operate independently of any associated vehicle, wired external power source, and/or other external elements. The rechargeable battery pack may be removable for easier charging or to allow the rechargeable battery pack to be replaced as needed to meet power requirements.

The self-powered mountable speaker bar may include various mounting or attachment features that may provide device stability while attached to a powersport vehicle (e.g., motorcycles, all-terrain vehicles (ATVs), snowmobiles, personal watercraft (PWC), boats, recreational vehicles (RVs), other off-road vehicles, etc.) and/or other mounted application. The mounting or attachment features may be associated with tubes, bars, or other cylindrical components that may be coupled to a vehicle.

Although several examples provided herein may refer to specific shapes or arrangements of components, such as a cylindrically-shaped housing and mounting features associated with tubes or bars, one of ordinary skill in the art will recognize that various different embodiments may be differently shaped and/or associated with various other types of mounting features.

FIG. 1 illustrates a front elevation view of a self-powered mountable speaker bar 100. The self-powered mountable speaker bar 100 may include a housing or "main body" 110, one or more speakers or other output ports 120, various mounting or attachment features 130, and various user interface (UI) features 140.

In this example, the housing 110 has a cylindrical shape. Different embodiments may include housings 110 having various different shapes, such as cuboid, spheroid, compound shapes, etc. The housing 110 may be configured to be mounted to a linear tube or similar support. As such, the housing 110 may generally have a length greater than a width, depth, or circumference.

The housing 110 may be rigid or semi-rigid and may include a rigid frame or other types of structural supports (not shown) that may allow the housing to withstand use under various scenarios (e.g., during powersports, at remote sites lacking electrical service, etc.). For rigid housings 110, such as those including a metal or plastic tube, the housing 110 may serve as the support structure and may include various connection elements (e.g., through-holes, tabs, etc.) that may allow various other elements (e.g., mounting features 130) to be securely coupled to the housing 110. The housing 150 may include various shock-resistant or shock-proof features, such as damping elements, springs, flexible section or elements, and/or other appropriate shock-resistant features (e.g., a rubberized outer layer).

In some embodiments, the housing 110 may be waterproof, dust-proof, and/or resistant to other types of contaminants. For instance, the components of housing 110 may be joined using waterproof gaskets or other similar features. As another example, elements such as speakers 120 may include waterproof materials and/or coatings and/or may be coupled to the housing 110 using waterproof adhesives, seals, gaskets, etc.

Speakers 120 may be arranged in various different ways, depending on the size, shape, and/or other attributes of housing 110. In this example, four speakers 120 are included. Different embodiments may include different numbers of speakers. Some embodiments may include other types of audio outputs. For instance, housing 110 may include various output ports (e.g., circular or funnel-shaped outlets). In some embodiments, some such output ports may provide passive elements (e.g., a passive sub-woofer outlet) that receive, amplify, and/or otherwise provide audio outputs generate by other components, such as speakers 120.

The mounting or attachment features 130 may include various holes, lips, clamps, screws, toggles, levers, tabs, etc. that may allow the self-powered mountable speaker bar 100 to be coupled to various complementary mounting features (e.g., slots, pins, recesses, etc.) associated with various support elements (e.g., tubes, bars, racks, etc.). The mounting features 130 may be coupled to various support elements (e.g., an internal frame, not shown) that may allow the self-powered mountable speaker bar 100 to be securely coupled to a bar, rack, or other complementary mounting features. The mounting features 130 may include shock-absorption elements (e.g., rubber gaskets, springs, flexible members, etc.) that may dampen transfer of force from the mounting features 130 to the support elements.

In this example, the mounting features 130 are located at the distal ends of the housing 110. Some embodiments of the self-powered mountable speaker bar 100 may include additional mounting features 130 distributed along the length of the housing 110. Some embodiments of the self-powered mountable speaker bar 100 may include a single mounting feature 130.

The UI features 140 may include various elements that may allow a user to interact with the self-powered mountable speaker bar 100. The UI features 140 may include, for example, input elements such as buttons, keypads, microphones, cameras, etc. The UI features 140 may include, for example, output elements such as display screens, indicator lights or light emitting diodes (LEDs), speakers, etc. The UI features 140 may include input/output elements such as a touchscreen display.

Figure 2:
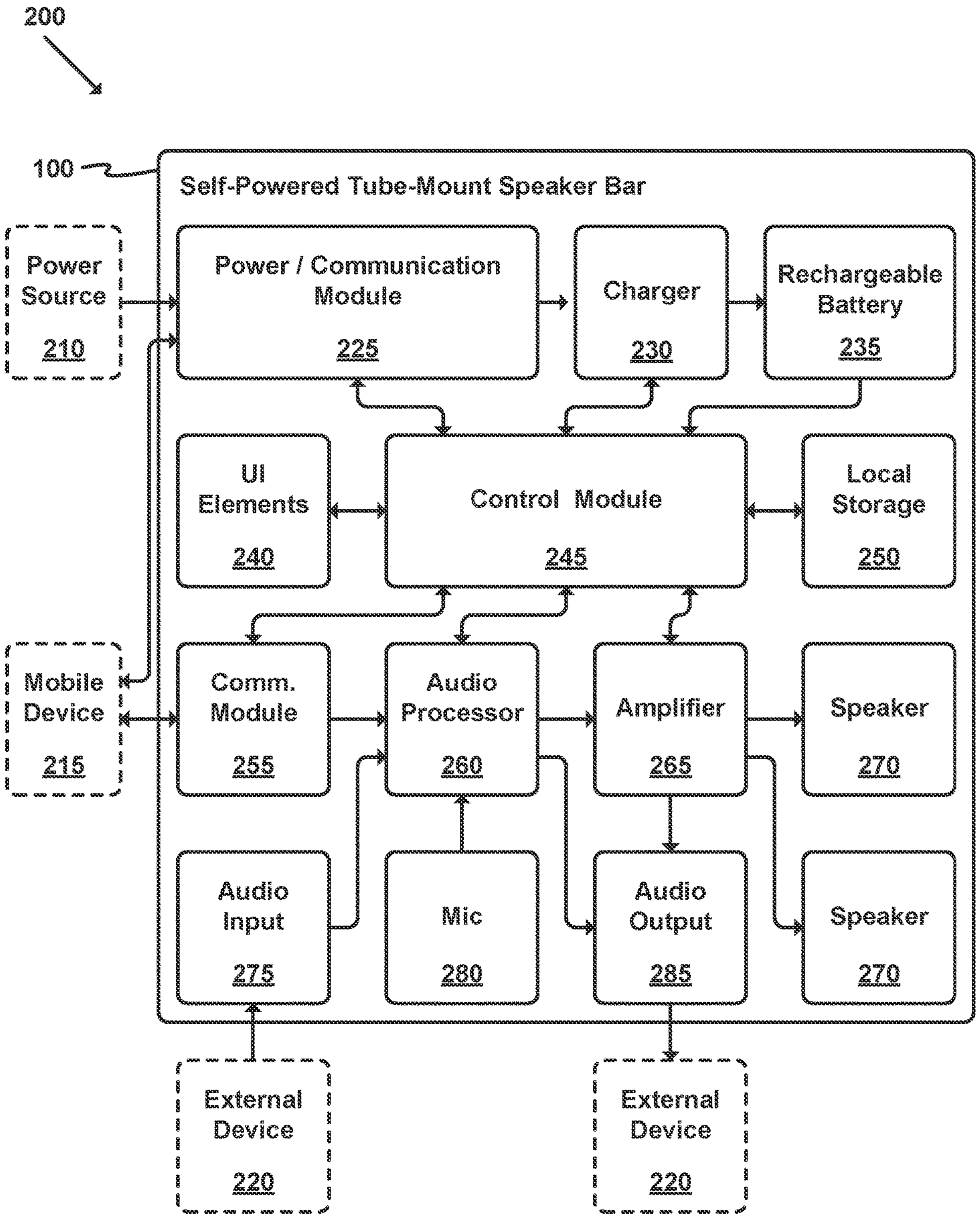
FIG. 2 illustrates a schematic block diagram of an environment according to an exemplary embodiment of the invention.

FIG. 2 illustrates a schematic block diagram of an environment 200 that includes the self-powered mountable speaker bar 100. As shown, environment 200 may include self-powered mountable speaker bar 100, a power source 210, a user device 215, and a set of external devices 220.

Power source 210 may be any source capable of providing power and connecting to the self-powered mountable speaker bar 100 (e.g., an AC power source, a USB connection to a powered device such as a PC, an external battery, a solar cell, etc.). The user device 215 may be any device that is capable of communicating with the self-powered mountable speaker bar 100 (e.g., a smartphone, tablet, wearable device such as a smartwatch, mp3 player, DVD or blu-ray player, etc.). Such communication may be wired and/or wireless, as appropriate. The external devices 220 may be external input sources (e.g., external microphones, instruments, mixers, etc.), external output sources (e.g., external speakers, recording devices, etc.), and/or input/output sources (e.g., a PC or user device, a headset with microphone, etc.).

Self-powered mountable speaker bar 100 may include a power and/or communication module 225, a charger 230, a rechargeable battery 235, a set of UI elements 240, a control module 245, local storage 250, a communication module 255, an audio processor 260, an amplifier 265, a set of speakers 270, a set of audio inputs 275, a microphone 280, and a set of audio output 285.

Power and/or communication module 225 may be provided via a physical port (e.g., a USB port or other appropriate cable connector). Such a module may be able to receive power and/or data through the physical port and communicate with other system elements. In addition, the power and/or communication module 225 may output power and/or data through the physical port. In some embodiments, the self-powered mountable speaker bar 100 may be able to be operated using a power source provided through the power and/or communication module 225.

Charger 230 may receive power from the power input 225 and provide charging power to the rechargeable battery 235, as appropriate. In addition, some embodiments may allow the charger 230 to receive battery power and provide the power to an external device connected to the power and/or communication module 225. Rechargeable battery 235 may include one or more physical elements capable of storing power. The self-powered mountable speaker bar 100 may be operated using power stored by the battery 235 and provided to the other elements of self-powered mountable speaker bar 100 (e.g., via a power bus).

UI elements 240 may include various elements for receiving inputs from a user (e.g., buttons, switches, touchscreens, etc.) and various elements for providing outputs to a user (e.g., indicator LEDs, touchscreens, display elements, etc.). In some embodiments, various UI elements may be provided by an external device. For instance, a smartphone may be used to provide control inputs to the self-powered mountable speaker bar 100 and/or display outputs from the device.

Control module 245 may interact with various other modules to control operations, communications pathways, etc. The control module may include various physical elements (e.g., switches, logic elements, programmable ICs, processors, etc.) and/or virtual elements (e.g., software modules, interfaces, etc.). The control module 245 may receive and evaluate inputs (e.g., inputs received via the UI elements 240) and generate appropriate outputs that are able to at least partially control functionality of the other modules of self-powered mountable speaker bar 100. Local storage 250 may be able to store data and/or instructions for use by the control module 245 (and/or other elements of self-powered mountable speaker bar 100). Such data may include, for example, user preferences, default values, operating algorithms, media content, etc.

The communication module 255 may be able to communicate with various external elements (e.g., a user device such as a smartphone) using various appropriate pathways (e.g., a wired connection, a Bluetooth connection, a Wi-Fi connection, etc.). The communication module may be at least partially controlled using a UI element 240 (e.g., a button) and/or the control module 245 (which may include commands received from an external device).

The audio processor 260 may be able to receive inputs from the audio inputs 275, the communication module 255, the control module 245, the microphone 280 and/or other elements and generate an appropriate output signal to send to the amplifier 265, audio output 285, and/or other appropriate elements. The audio processor 260 may be able to send and/or receive analog and/or digital signals, as appropriate.

The amplifier 265 may include various components capable of receiving an audio signal and generating an output that is able to drive one or more speakers 270. Such an amplifier 265 may also be able to generate an output that is able to drive one or more audio outputs 285. Each speaker 270 may be able to receive an audio signal and convert the signal to audible sound.

Each audio input 275 may include an input port or other appropriate connection and be able to receive inputs from an external device 220 and pass the input to the audio processor 260. Each microphone 280 may be able to capture audible sounds and generate an appropriate output to send to the audio processor 260. In some embodiments, the microphone 280 may automatically convert the received sounds to a set of digital signals.

Each audio output 285 may include an output port or other appropriate connection and be able to generate outputs and pass the outputs to various external devices 220. Such outputs may be formatted in various appropriate ways, depending on the type of external device. In some embodiments, at least one audio input 275 and at least one audio output 285 may share a single connection port.

Different embodiments may include other different features, such as one or more video display elements (e.g., LCD panels, LED screens, touchscreens, etc.) and/or video input elements (e.g., a camera). In addition, some embodiments may include processing elements such as video and/or audio encoders and/or decoders. Such encoders and/or decoders may be implemented using different combinations of hardware, as appropriate.

During a typical operation scenario, a user device 215 may provide streaming audio content to the communication module 255 over a wireless channel (e.g., Bluetooth). The audio content may be delivered to the audio processor 260 which, in turn, provides an audio output to the amplifier 265 and the speakers 270. The content delivery (e.g., volume, type of content, etc.) may be controlled based on inputs received from UI elements 240 (and/or other appropriate elements) and interpreted by the control module 245.

In another typical operation scenario, a user device 215 may be coupled to the self-powered mountable speaker bar 100 such that the self-powered mountable speaker bar 100 may be used as a speakerphone. The self-powered mountable speaker bar 100 may be able to receive inputs from the microphone 280, convert the inputs using the audio processor 260 and/or control module 245, and send the converted inputs to the user device 215. The user device may then send the received inputs to another party. The user device may further receive communications from the other party and relay the communications to the self-powered mountable speaker bar 100 which may, in turn, process the received information using the communication module 255, audio processor 260, amplifier 265, and delivering the communications to a user through the speaker(s) 270.

If a power source 210 is connected, the device may be at least partially powered from the source and the rechargeable battery 235 may be charged via the charger 230 and power input 225. Alternatively, if no power source 210 is connected, the device may operate on power provided by the rechargeable battery 235.

One of ordinary skill in the art will recognize that the system 200 and self-powered mountable speaker bar 100 are conceptual in nature and may be implemented in various different ways without departing from the spirit of the invention. For instance, some embodiments may include different modules than those shown (e.g., additional modules, fewer modules, combined modules, divided modules, etc.). As another example, different embodiments may include various different communication pathways than shown. As still another example, different embodiments may include different numbers of inputs, outputs, ports, etc. than shown.

Figure 3:
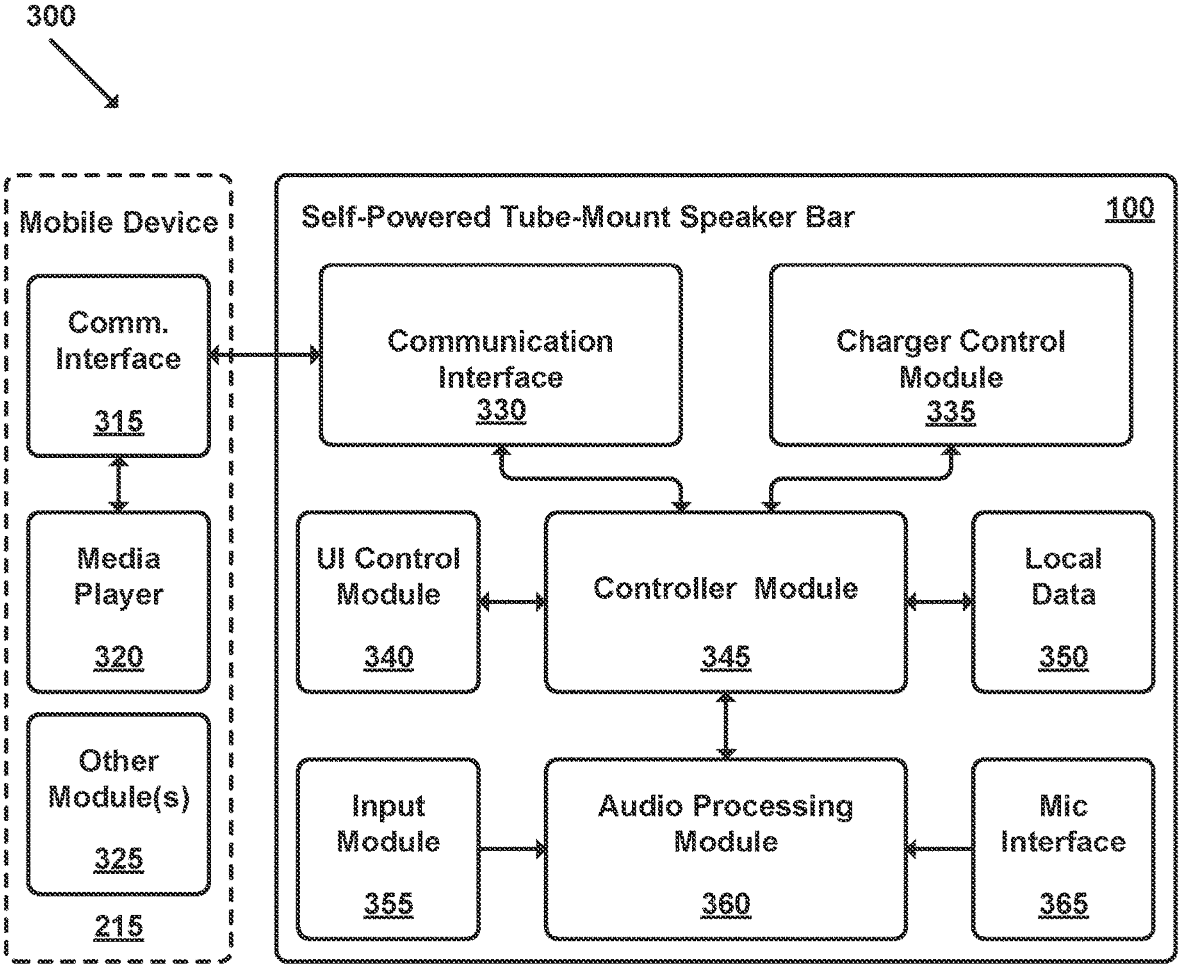
FIG. 3 illustrates a schematic block diagram of another environment according to an exemplary embodiment of the invention.

FIG. 3 illustrates a schematic block diagram of another environment 300 that includes the playback element 100. As shown, environment 300 may include a self-powered mountable speaker bar 100 and a user device 215. Some embodiments may include other elements (e.g., external devices, additional user devices, etc.).

The user device 215 may include a communication interface 315, a media player 320, and/or other modules 325. The communication interface 315 may allow the user device 215 to communicate with the self-powered mountable speaker bar 100 (e.g., via a cable connection, via a Bluetooth or other wireless connection, etc.). In some embodiments, the communication interface 315 may simply include a physical connection (e.g., a jack that allows for a cable to connect the devices).

The media player 320 may be able to access multimedia content (e.g., from a local storage of the user device 215, via a network connection, etc.) and generate output data associated with the media content. In addition, the media player 320 may be able to receive (e.g., via the communication interface 315, from a user interface of the user device 215, etc.) commands that may at least partially control operation of the media player 320 (e.g., pause, play, next, etc.).

The other modules 325 may be able to provide various other features. Such features may include, for instance, UI features, local storage access, remote storage access, and/or multimedia playback and/or display.

Self-powered mountable speaker bar 100 may include a communication interface 330, a charger control module 335, a UI control module 340, a controller module 345, local data 350, an input module 355, an audio processing module 360, and a microphone interface 365.

The communication interface 330 may allow the various modules of the self-powered mountable speaker bar 100 to communicate with the user device 215 (e.g., via a cable connection, via a Bluetooth or other wireless connection, etc.). Some embodiments may include multiple communication interfaces 330, such that a first connection may be made with a first device, a second connection with a second device, etc. In addition, multiple types of communication interfaces 330 may be included in a single self-powered mountable speaker bar 100 (e.g., a wired interface such as a USB connector, a wireless interface such as Bluetooth, etc.).

The charger control module 335 may manage the charging of a rechargeable battery included in some embodiments. The module may be able to receive power from various sources (e.g., a connection to an external source, an internal or local source such as a solar cell embedded in housing 110, etc.). The charger module may be able to communicate with the controller module 345 and/or be able to determine a current battery charge level. In this way, the charger module 335 may be able to control the amount of available power used to charge the battery. In some embodiments, the charger control module may be able to receive power from the internal battery and provide charging power to an external source (e.g., a user device such as a smartphone).

The UI control module 340 may allow the self-powered mountable speaker bar 100 to receive user inputs and provide outputs to the user. For instance, the UI control module 340 may receive signals associated with various physical buttons on the self-powered mountable speaker bar 100. In addition, the UI control module 340 may provide various visual indications (e.g., using LEDs of various colors, using a touchscreen of a user device, etc.). Such a UI control module 340 may be able to receive data from various types and quantities of inputs and provide data to various types and quantities of outputs.

The controller module 345 may be able to communicate among the various other modules, execute various logical operations and/or instructions, and/or access local data 350. Local data may include data such as user settings, paired device information, media content, etc.

The input module 355 may include various interfaces and/or conversions that may allow the self-powered mountable speaker bar 100 to receive inputs from external sources (e.g., audio devices, cameras, microphones, etc.). The audio processing module 360 may include various elements that are able to receive signals from the inputs module(s), microphone interfaces 365, and/or other appropriate elements and generate outputs that are able to be sent to an external device (e.g., user device 215) or otherwise used by the self-powered mountable speaker bar 100 (e.g., for voice-control functionality related to the self-powered mountable speaker bar 100 UI). The microphone interface 365 may include various elements that able to receive signals from a microphone and generate appropriate outputs for use by the audio processing module 360 and/or other appropriate modules.

During operation, a communication link may be established between the user device 215 and self-powered mountable speaker bar 100 through the communication interfaces 315 and 330. Media content may be provided form the media player 320 and/or other modules 325 and sent to the self-powered mountable speaker bar 100 over the link. The data received by the self-powered mountable speaker bar 100 may be passed through the controller 345 to the audio processing module 360 and output by the device (e.g., using a set of speakers associated with the audio processing module).

The UI control module 340 may continuously determine whether any inputs have been received. Such received inputs may be passed to the controller 345 which may, in turn, perform a set of operations based on the received inputs. For instance, an input such as a button press may be associated with increasing volume through the audio processing module 360. Pressing a different button may cause the self-powered mountable speaker bar 100 to enter a speakerphone mode when connected to an appropriate user device 215 (e.g., a smartphone or other cellular communication device). In addition, the UI control module 340 may receive inputs that are passed through the controller 345 and interface 330 to the user device 215, where the data received by the user device may cause the user device to perform various appropriate operations (e.g., at least partially controlling the operation of the media player 320, causing the device 215 to end a call, etc.).

During speakerphone operation, the self-powered mountable speaker bar 100 may act as an external microphone and speakers for the user device 215. Audio inputs may be received through the microphone interface 365, processed, and passed to the user device 215 over the link, such that the user device may transmit the received audio to another party to the call. Likewise, audio that would normally be provided through an internal speaker or headset of the user device may instead be passed to the self-powered mountable speaker bar 100 over the link, processed, and output through a set of speakers included in the self-powered mountable speaker bar 100.

One of ordinary skill in the art will recognize that the system 300 and self-powered mountable speaker bar 100 are conceptual in nature and may be implemented in various different ways without departing from the spirit of the invention. For instance, some embodiments may include different modules than those shown (e.g., additional modules, fewer modules, combined modules, divided modules, etc.). As another example, different embodiments may include various different communication pathways than shown. As still another example, different embodiments may include different numbers of interfaces, inputs, outputs, etc. than shown.

Figure 4:
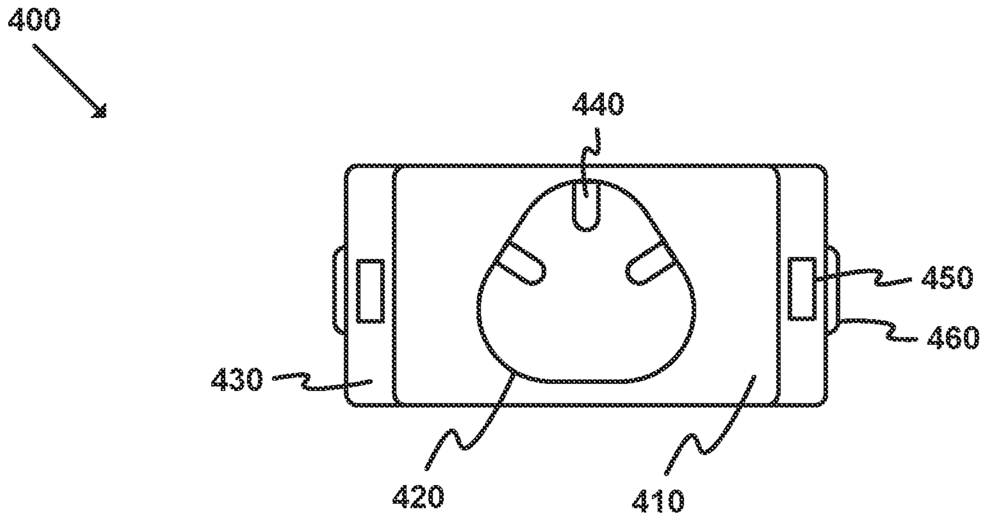
FIG. 4 illustrates a rear elevation view of a battery pack included with some embodiments of the self-powered mountable speaker bar of FIG. 1.
Figure 5:
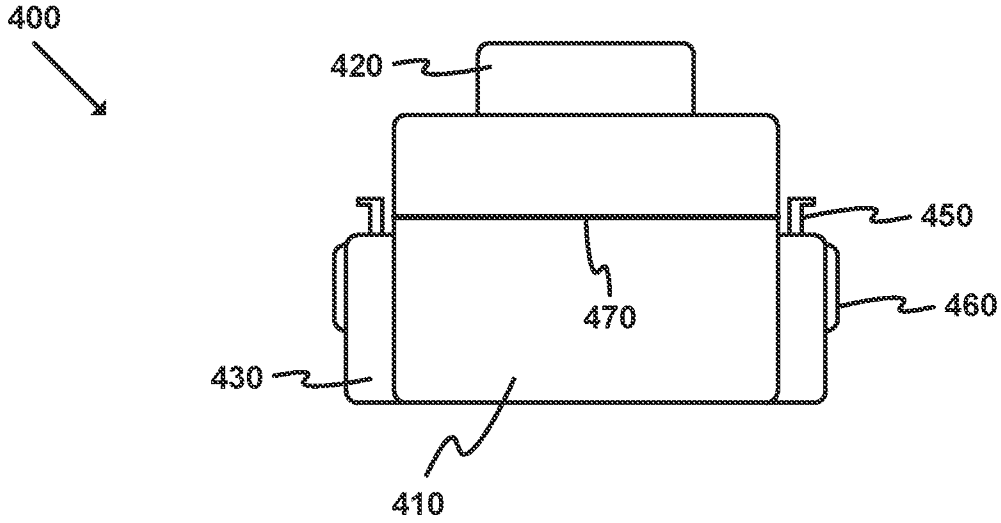
FIG. 5 illustrates a top plan view of the battery pack of FIG. 4.

FIG. 4 illustrates a rear elevation view of a rechargeable battery pack 400 included with some embodiments of the self-powered mountable speaker bar 100. FIG. 5 illustrates a top plan view of the rechargeable battery pack 400. As shown, the rechargeable battery pack 400 may include a battery module 410, a power connector 420, and a set of coupling features 430.

The battery module 410 may include a housing or other structural elements, electrical connectors, and/or other appropriate components such that power may be received from (or provided to) a set of batteries associated with the battery module 410. Each battery or "storage cell" in the battery module 410 may be able to be charged, discharged, and recharged many times. Different embodiments may include different numbers of batteries, types of batteries, sizes of batteries, arrangements of batteries, and/or other configuration variations as appropriate for a particular application. Such configuration attributes may be at least partly defined by parameters such as output power, desired battery life before recharging, and/or other relevant parameters. Batteries may include various combinations of electrode materials, such as lithium-ion, lithium iron phosphate, lithion ion polymer, lead-acid, zinc-air, nickel-cadmium, and/or other appropriate materials.

The power connector 420 may allow the rechargeable battery pack 400 to be coupled to the self-powered mountable speaker bar 100 or to a power source such as a charging module. The power connector 420 may include various pins, contacts, etc. 440 that may allow power to be provided by the rechargeable battery pack 400 to the self-powered mountable speaker bar 100 (and/or received from a source such as a charging module).

The coupling features 430 may allow the rechargeable battery pack 400 to be securely coupled to (and easily decoupled from) the self-powered mountable speaker bar 100. The coupling features 430 may include various clips, pins, tabs, etc. 450 that may be associated with complementary features of the self-powered mountable speaker bar 100, such as holes, recesses, cavities, slots, lips, etc. The coupling features 430 may further include elements such as springs, slides, etc. (not shown) that may allow the rechargeable battery pack 400 to be selectively and securely coupled to (and decoupled from) the self-powered mountable speaker bar 100.

For instance, in this example, the rechargeable battery pack 400 may include two spring-loaded extending tabs 450 that engage complementary slots of the self-powered mountable speaker bar 100 such that the rechargeable battery pack 400 may be securely coupled to the self-powered mountable speaker bar 100, and also easily released by compressing the springs to disengage the tabs from the complementary slots. The coupling features 430 may be coupled to, or otherwise associated with, user engagement features such as finger slots, buttons, or pads 460 such that a user may be able to manipulate the extending tabs 450 in order to attach the rechargeable battery pack 400 to the self-powered mountable speaker bar 100 (e.g., by releasing the buttons 460), or detach the rechargeable battery pack 400 from the self-powered mountable speaker bar 100 (e.g., by pressing the buttons 460). In this example, buttons 460 may be coupled to extending tabs 450 via one or more internal connecting members (not shown) and may include a spring-loading feature that forces the coupling features 430 to a securely connected state without intervention.

In some embodiments, coupling features 430 may include elements such as hook-and-loop straps attached to the rechargeable battery pack 400, with complementary slots located at the self-powered mountable speaker bar 100. Other coupling features 430 may include, for instance, rubber or silicon straps and associated buttons, screws or bolts and associated receptacles, compression fit couplings, etc.

The rechargeable battery pack 400 may be charged using an appropriate charging device or element that is able to couple to the power connector 420. The rechargeable battery pack 400 may include various indicators (e.g., a string of LEDs) that may indicate status (e.g., charging, operating, etc.), charge level, and/or other information.

Some embodiments of the rechargeable battery pack 400 may include a gasket or seal 470 that may prevent water, dust, and/or other contaminants from breaching the housing of the self-powered mountable speaker bar.

Different embodiments of the rechargeable battery pack 400 may have different storage capacities for various usage scenarios (e.g., use during a single sporting session, use over multiple sessions, extended use unrelated to sporting sessions, etc.). Different embodiments of the rechargeable battery pack 400 may be sized and/or shaped differently, depending on desired performance. For instance, a rechargeable battery pack 400 for a single session may be smaller and lighter than a comparable battery pack intended for use over multiple sessions.

Figure 6:
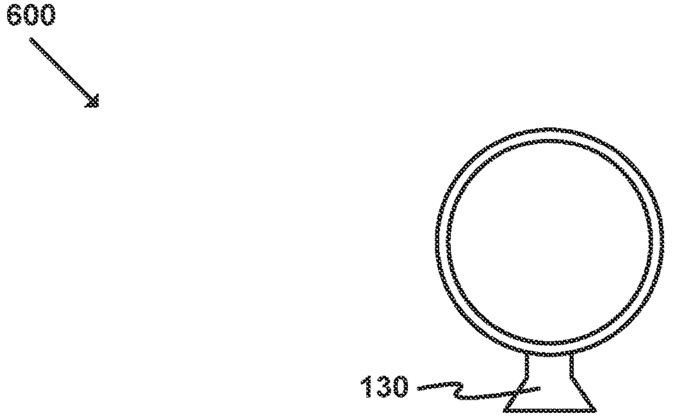
FIG. 6 illustrates a right-side elevation view of an end cap including a mounting feature included with some embodiments the self-powered mountable speaker bar of FIG. 1.
Figure 7:
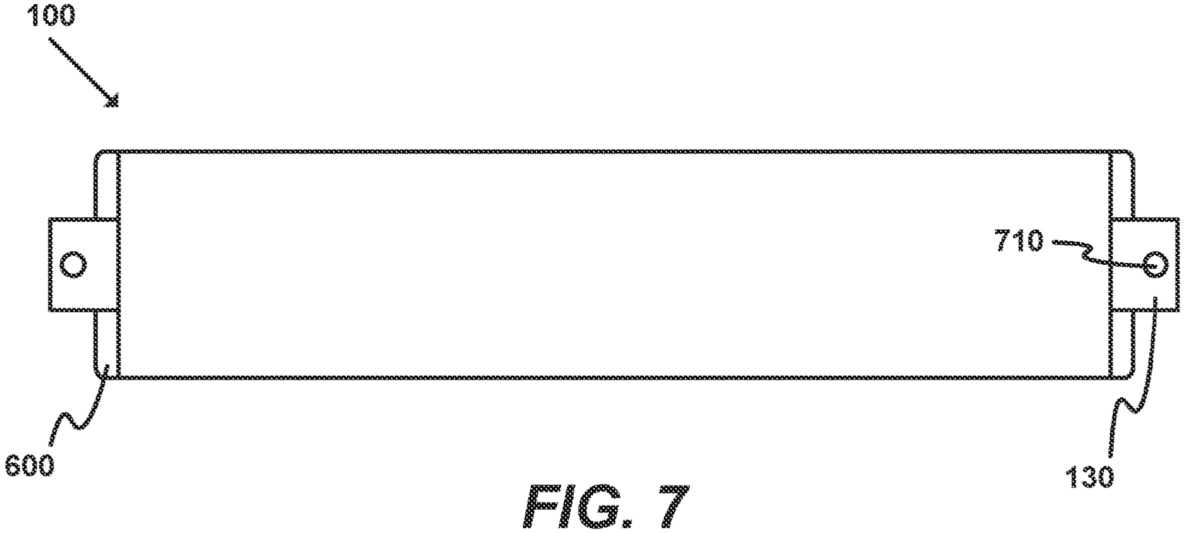
FIG. 7 illustrates a bottom plan view of the self-powered mountable speaker bar of FIG. 1 including a set of mounting features.

FIG. 6 illustrates a right-side elevation view of an end cap 600 including a mounting feature 130 included with some embodiments the self-powered mountable speaker bar 100. FIG. 7 illustrates a bottom plan view of the self-powered mountable speaker bar 100. As shown, the self-powered mountable speaker bar 100 may include two mounting features 130, each having a through-hole 710 (and/or other attachment features).

Figure 8:
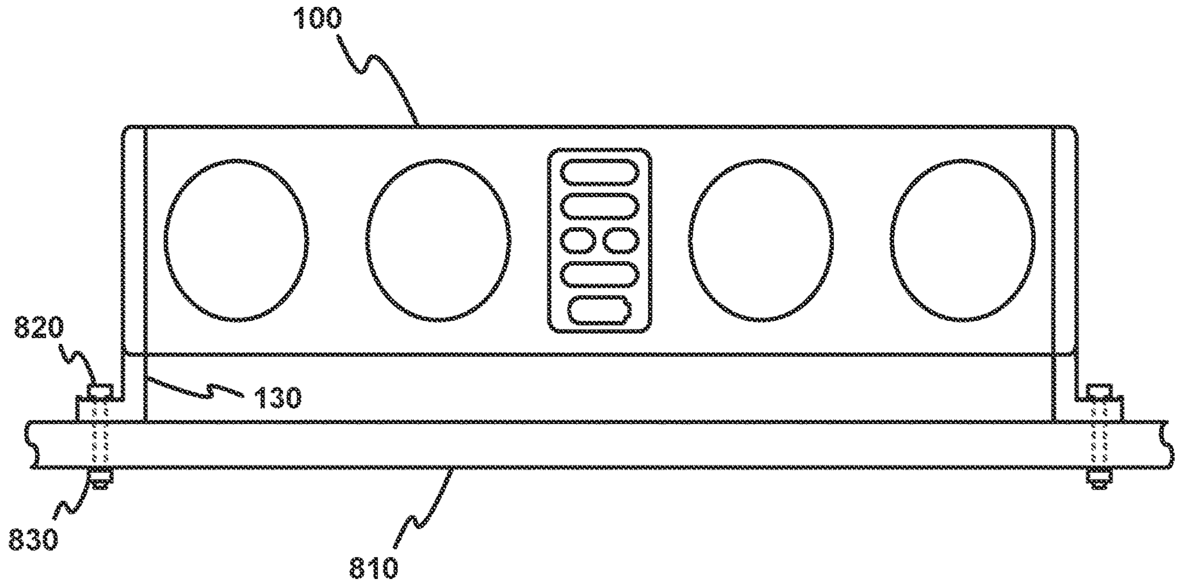
FIG. 8 illustrates a front elevation view of the self-powered mountable speaker bar of FIG. 1 as mounted to a tubular support using a first type of fastener.

FIG. 8 illustrates a front elevation view of the self-powered mountable speaker bar 100 as mounted to a tubular support 810 using a first type of fastener. Tubular support 810 may be associated with a powersports vehicle, RV, camping equipment, etc. In this example, each mounting feature 130 is coupled to the tubular support 810 via through-hole 710 using a bolt 820 and nut 830.

Figure 9:
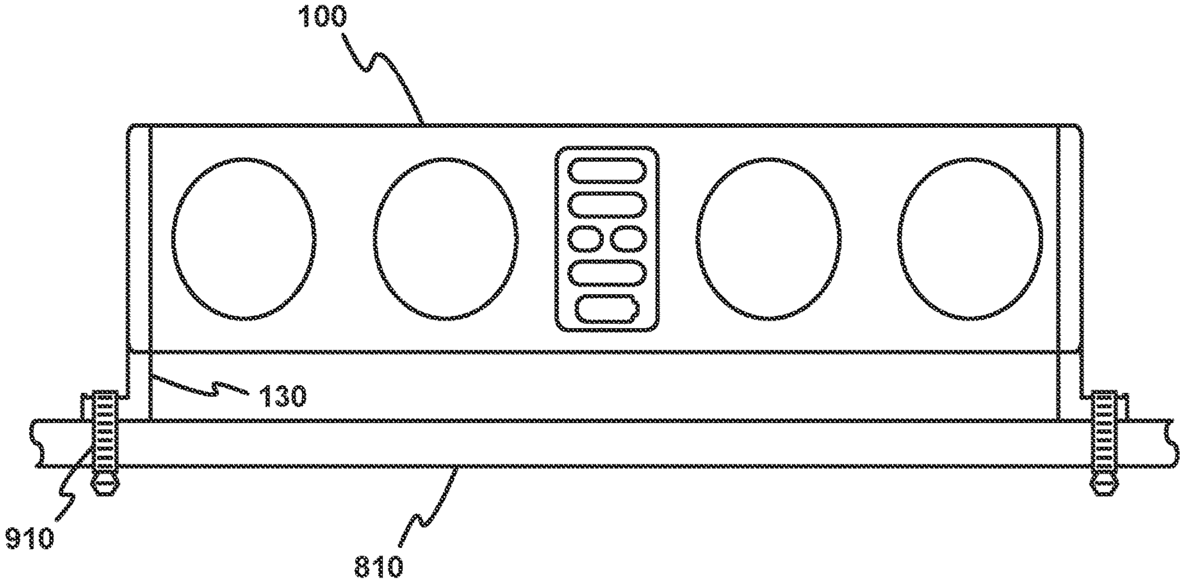
FIG. 9 illustrates a front elevation view of the self-powered mountable speaker bar of FIG. 1 as mounted to a tubular support using a second type of fastener.

FIG. 9 illustrates a front elevation view of the self-powered mountable speaker bar 100 as mounted to the tubular support 810 using a second type of fastener. In this example, each mounting feature 130 is coupled to the tubular support 810 using a worm clamp 910. Such a mounting feature 130 may be similarly utilized with elements such as zip ties, hook and loop straps, vise clamps, and/or other appropriate coupling or securing features or elements. The mounting feature 130 may include a "clamp receptacle" having a smooth flat or curved engagement surface and/or a "clamp retention element" such as a protruding lip.

Figure 10:
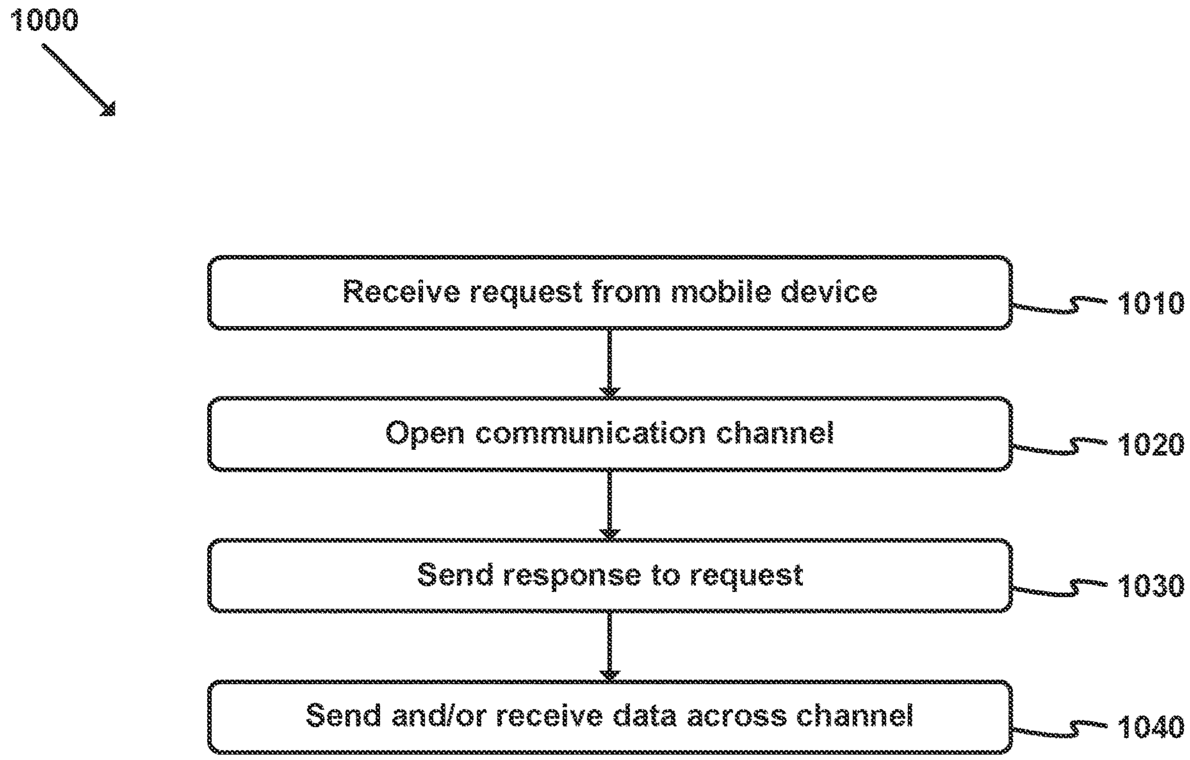
FIG. 10 illustrates a flow chart of an exemplary process for establishing communications in some embodiments.

FIG. 10 illustrates a flow chart of a process 1000 for establishing communications in some embodiments. Such a process may be performed by a device such as self-powered mountable speaker bar 100 described above, and may specifically use a module such as communication interface 330 described above (and/or other appropriate modules).

The process may begin, for instance, when a communication link of the self-powered mountable speaker bar 100 is activated (e.g., by receiving, via a UI element, a request to turn on a Bluetooth element). Next, the process may receive (at 1010) a request from a user device (e.g., user device 215 described above), such as a Bluetooth pairing request. Alternatively, the process may provide a signal to the user device indicating that the self-powered mountable speaker bar 100 is available for pairing.

Next, the process may open (at 1020) a communication channel and send (at 1030) a response to the request from the user device. Different embodiments may perform various different specific operations to open the channel (e.g., transferring a set of messages among the devices to be connected, assigning various parameter values, etc.). Such a communication channel may use various protocols, interfaces, and/or other elements, as appropriate.

Process 1000 may then send and/or receive (at 1040) data across the channel. Such data may include, for instance, multimedia data provided by the user device to the self-powered mountable speaker bar 100. The data may include, as another example, audio data associated with a phone call being provided by the user device to the self-powered mountable speaker bar 100, while the self-powered mountable speaker bar 100 may receive audio inputs through a microphone and send audio data associated with the phone call from the self-powered mountable speaker bar 100 to the user device.

Figure 11:
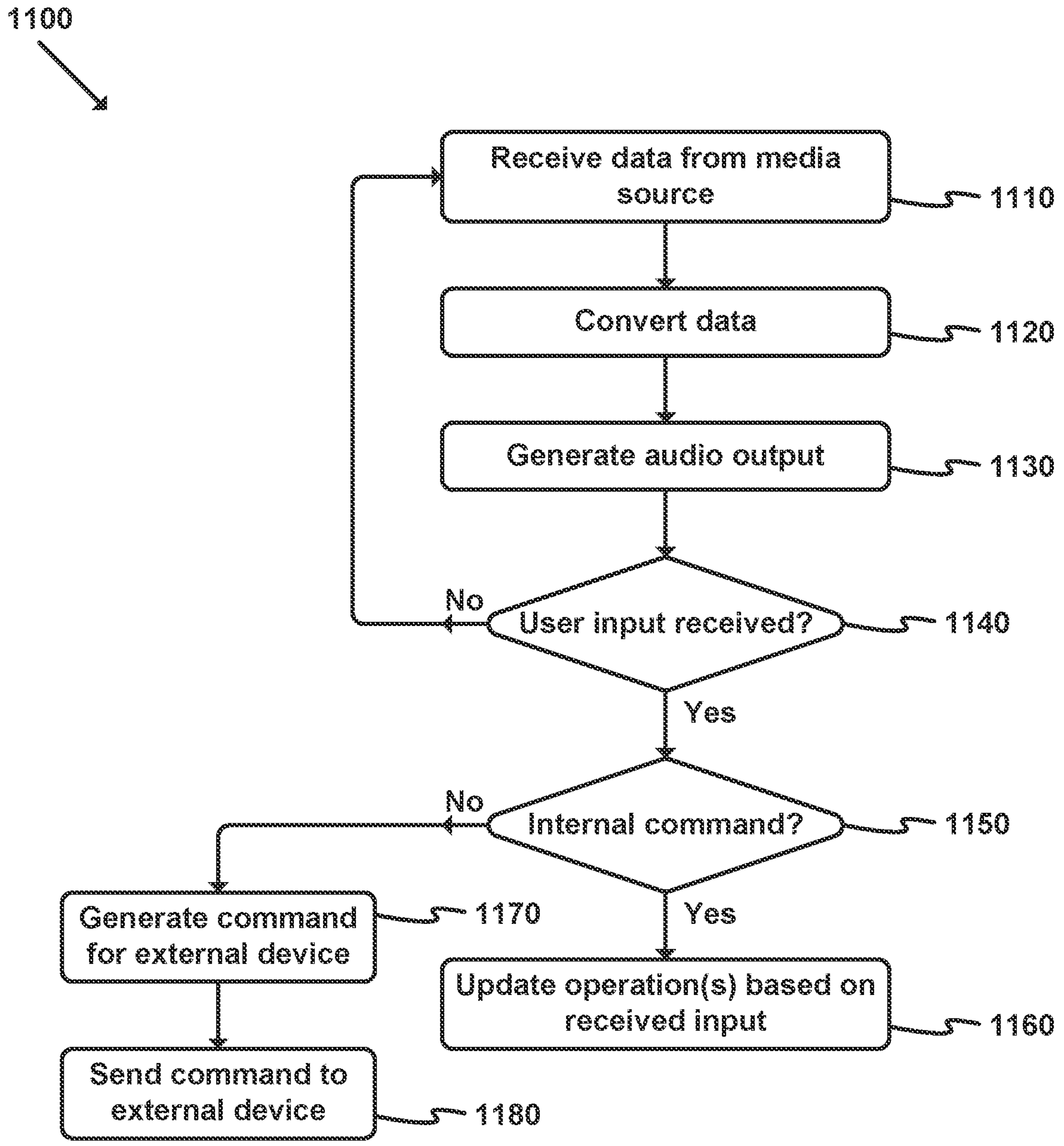
FIG. 11 illustrates a flow chart of an exemplary process for receiving, playing, and controlling media in some embodiments.

FIG. 11 illustrates a flow chart of a process 1100 for receiving, playing, and controlling media in some embodiments. Such a process may be performed by a device such as self-powered mountable speaker bar 100 described above. The process may begin, for instance, after a communication channel or link has been established (e.g., using process 1000 described above) and a media source (e.g., a device such as user device 215 described above) begins providing data over the link.

As shown, the process may receive (at 1110) data from the media source. Such data may be associated with various types of multimedia and/or other data (e.g., audio data, video data, control commands, etc.). Next, the process may convert (at 1120) the received data. Such conversion may include, for instance, generating an analog audio signal output based at least partly on a received bit stream. As another example, conversion may involve decoding a command into a format that may be used to at least partially control the operation of the self-powered mountable speaker bar 100.

The process may then generate (at 1130) an audio output (and/or other types of multimedia outputs). The audio output may be generated, for instance, by providing an audio signal to an audio processor that may perform various operations (e.g., equalization, compression, etc.) to the signal and then send the signal to an audio amplifier such that the audio may be output through a set of speakers (or other appropriate elements). Similarly, other types of outputs (e.g., video) may be processed and output through an appropriate element (e.g., a display screen).

Next, the process may determine (at 1140) whether any user input has been received. Such an input may be received through one or more UI elements of the self-powered mountable speaker bar 100, as described above. If the process determines (at 1140) that no user input has been received, the process may end.

If the process determines (at 1140) that a user input has been received, the process may then determine (at 1150) whether the input is associated with an "internal" command. Such an internal command may be any command that directly controls the operation of the self-powered mountable speaker bar 100 (e.g., volume, activate wireless channel, etc.). If the process determines (at 11550) that the input is associated with an internal command, the process may update (at 1160) the operation of the multimedia element based at least partly on the received input (e.g., by raising or lowering the volume, by activating wireless communication circuitry, etc.) and then may end.

If the process determines (at 1150) that the command is not internal (i.e., that the command is related to operations of a connected device), the process may generate (at 1170) a command for the external connected device, send (at 1180) the command to the external device and then may end. Such "external" commands may include, for instance, next, previous, etc. and may allow a user to at least partially control multimedia data that is sent to the self-powered mountable speaker bar 100 (e.g., by skipping a song in a playlist, by replaying a song, etc.). The external device command may be generated in various appropriate ways and may be formatted appropriate for the device receiving the command. Some embodiments may send such a command over a wireless communication link (e.g., Bluetooth).

Some embodiments may iteratively perform operations 1110-1180 as long as a connection exists between the self-powered mountable speaker bar 100 and the user device. In some embodiments, various operations may be performed in parallel (e.g., media data may continuously be received and output while also continuously monitoring for user inputs).

Figure 12:
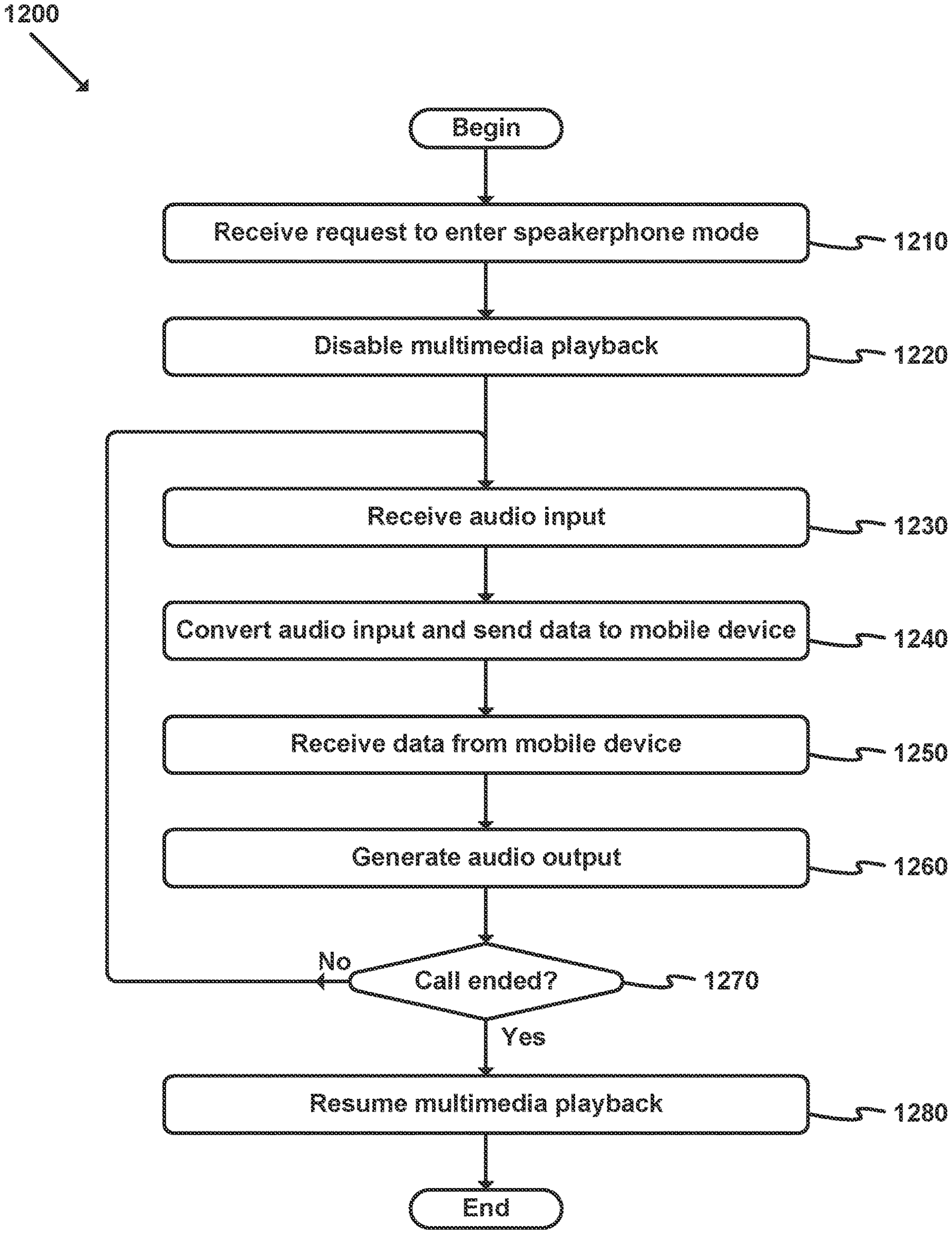
FIG. 12 illustrates a flow chart of an exemplary process for implementing a speakerphone feature in some embodiments.

FIG. 12 illustrates a flow chart of a process 1200 for implementing a speakerphone feature in some embodiments. Such a process may be performed by a device such as self-powered mountable speaker bar 100 described above. The process may begin, for instance, after a communication channel or link has been established (e.g., using process 1000 described above).

As shown, process 1200 may receive (at 1210) a request to enter speakerphone mode. Such a request may be received in various appropriate ways (e.g., a user may press a button associated with the speakerphone function). Next, the process may disable (at 1220) multimedia playback (e.g., if the self-powered mountable speaker bar 100 is currently producing audio related to a media stream, the audio output may be disabled and/or a request to pause or stop the stream may be send to a connected device).

The process may then receive (at 1230) audio inputs (e.g., through a microphone of the self-powered mountable speaker bar 100). Next, the process may convert (at 1240) the received input and send the resulting data to the connected user device. Such conversion may include analog to digital conversion, signal processing, and/or other appropriate operations. The data may be sent over a wireless communication link (e.g., Bluetooth).

Next, the process may receive (at 1250) data from the connected user device. Such data may include, for instance, audio data associated with the phone call. The process may then generate (at 1260) an audio output (e.g., by processing the received audio data and providing audio through a set of speakers) based at least partly on the data received from the user device.

Process 1200 may then determine (at 1270) whether the call has ended. Such a determination may be made in various appropriate ways (e.g., based on a message and/or command received from the user device, based on a user input received at the self-powered mountable speaker bar 100, etc.). If the process determines (at 1270) that the process has not ended, the process may iteratively perform operations 1220-1270 until the process determines (at 1270) that the call has ended.

If the process determines (at 1270) that the call has ended, the process may automatically resume (at 1280) multimedia playback (if appropriate) and then end. Alternatively, if no media had been streaming prior to the call, the process may end after determining (at 1270) that the call has ended.

One of ordinary skill in the art will recognize that processes 600-1200 may be implemented in various different ways without departing from the scope of the disclosure. For instance, the elements may be implemented in a different order than shown. As another example, some embodiments may include additional elements or omit various listed elements. As yet another example, elements or sets of elements may be performed iteratively and/or based on satisfaction of some performance criteria. As another example, elements may be performed in parallel.

Figure 13:
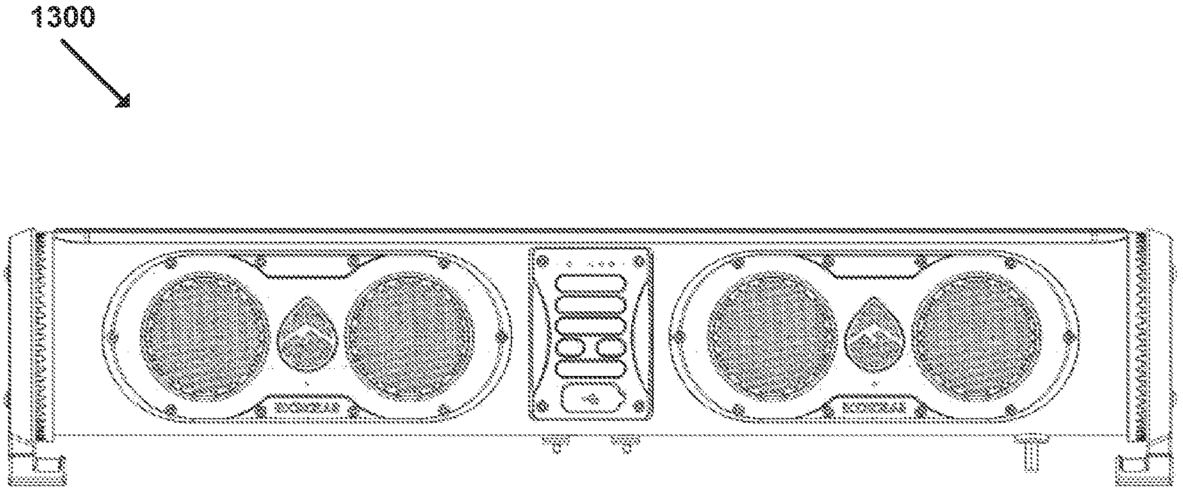
FIG. 13 illustrates a front elevation view of an exemplary self-powered mountable speaker bar of some embodiments.
Figure 14A:
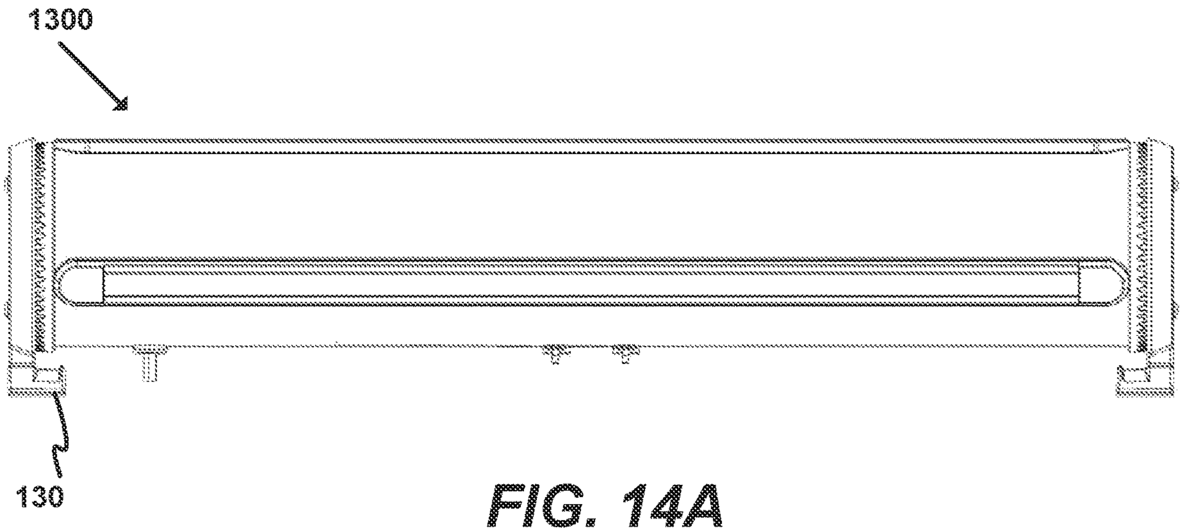
FIG. 14A illustrates a rear elevation view of the exemplary self-powered mountable speaker bar of FIG. 13.
Figure 14B:
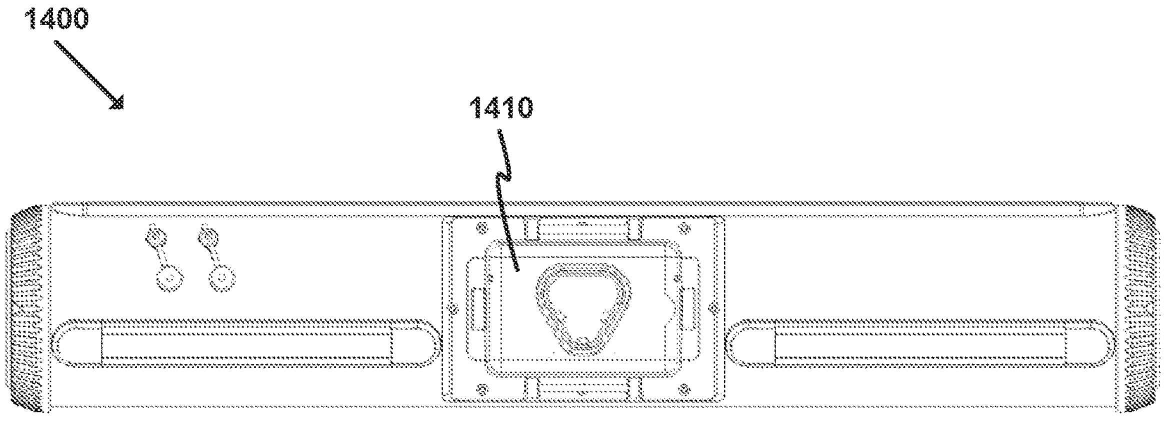
FIG. 14B illustrates a rear elevation view of an alternative exemplary self-powered mountable speaker bar including a receptacle for a removable battery pack.
Figure 14C:
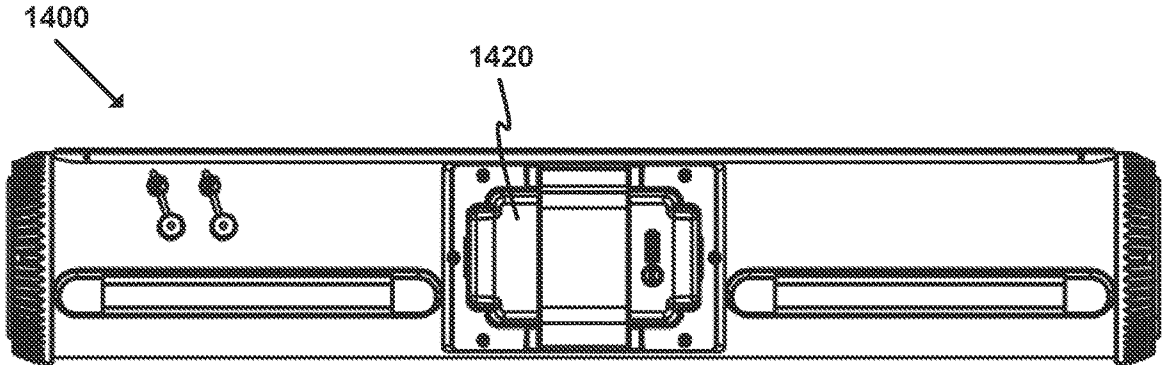
FIG. 14C illustrates a rear elevation view of the alternative exemplary self-powered mountable speaker bar of FIG. 14B with the removable battery pack installed.
Figure 15A:
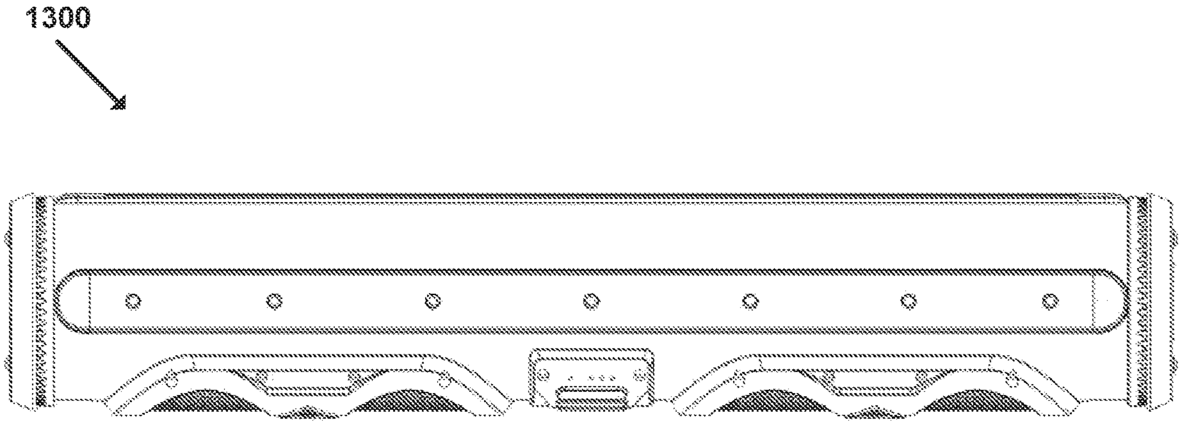
FIG. 15A illustrates a top plan view of the exemplary self-powered mountable speaker bar of FIG. 13.
Figure 15B:
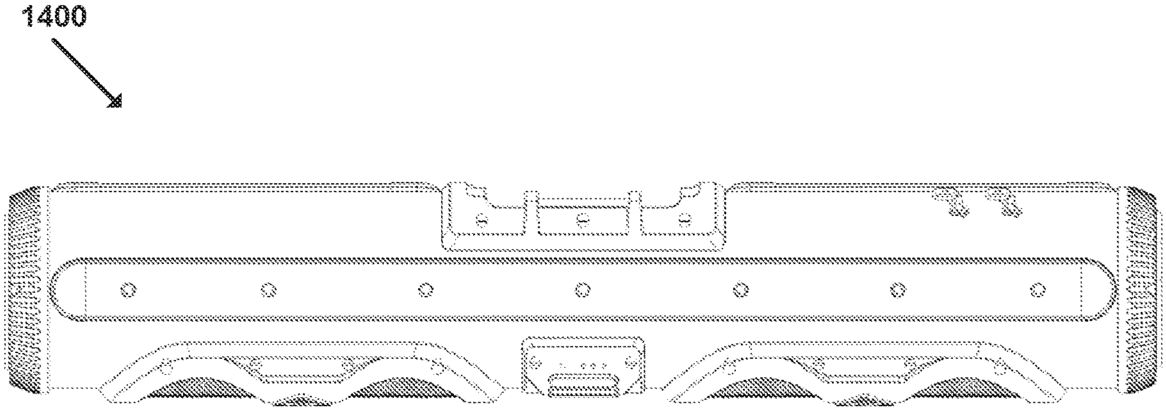
FIG. 15B illustrates a top plan view of the alternative exemplary self-powered mountable speaker bar of FIG. 14B.
Figure 15C:
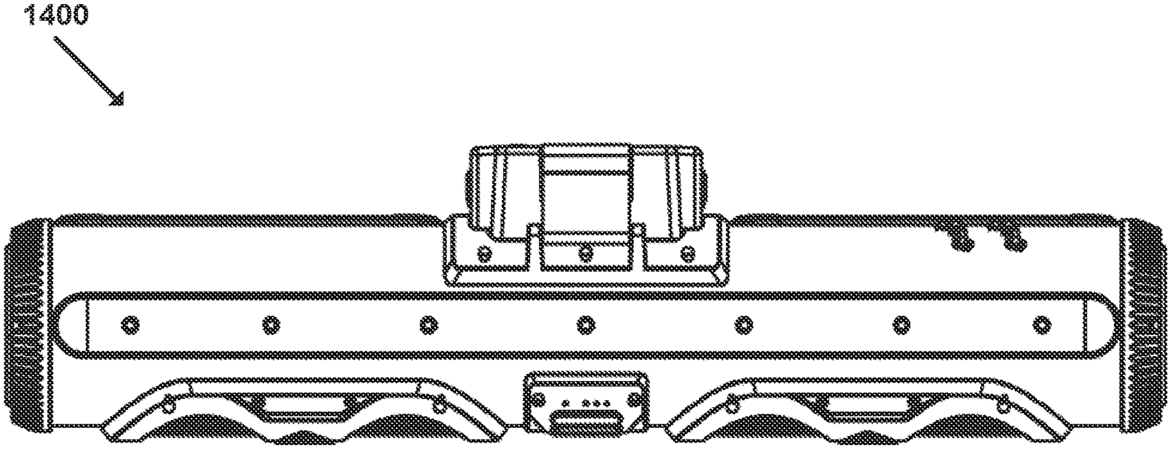
FIG. 15C illustrates a top plan view of the alternative exemplary self-powered mountable speaker bar of FIG. 14B with the removable battery pack installed.
Figure 16A:
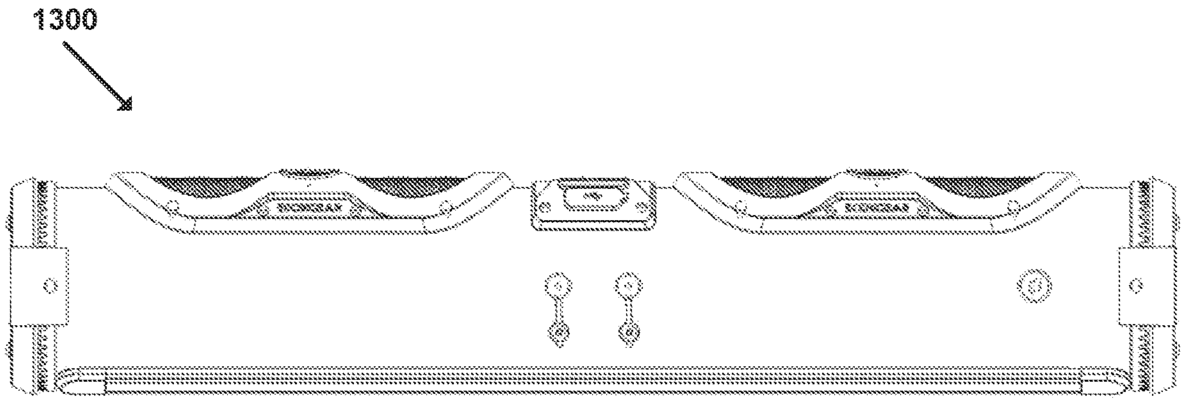
FIG. 16A illustrates a bottom plan view of the exemplary self-powered mountable speaker bar of FIG. 13.
Figure 16B:
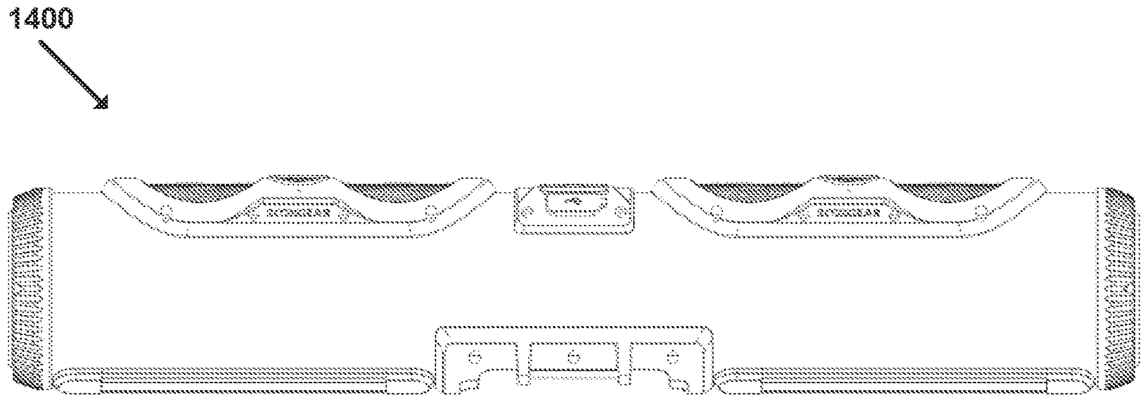
FIG. 16B illustrates a bottom plan view of the alternative exemplary self-powered mountable speaker bar of FIG. 14B.
Figure 16C:
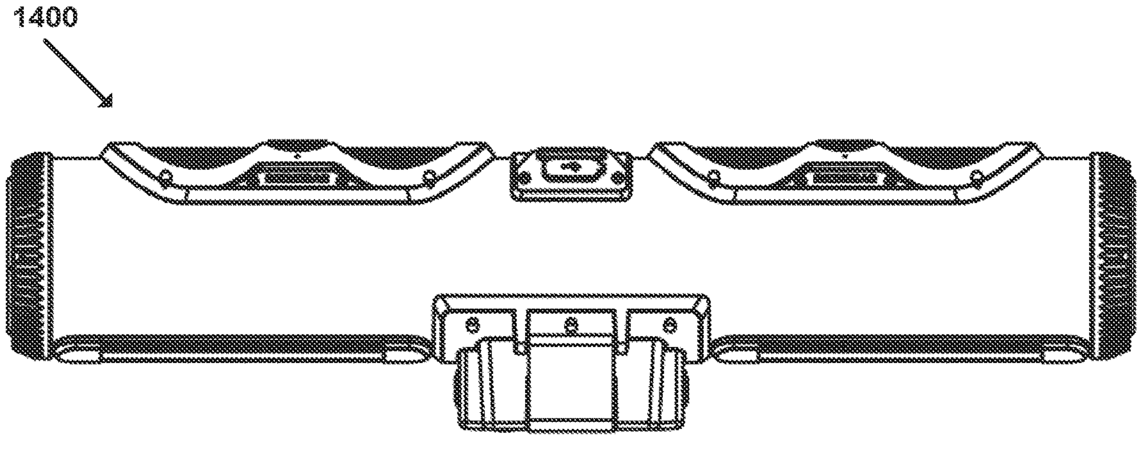
FIG. 16C illustrates a bottom plan view of the alternative exemplary self-powered mountable speaker bar of FIG. 14B with the removable battery pack installed.
Figure 17:
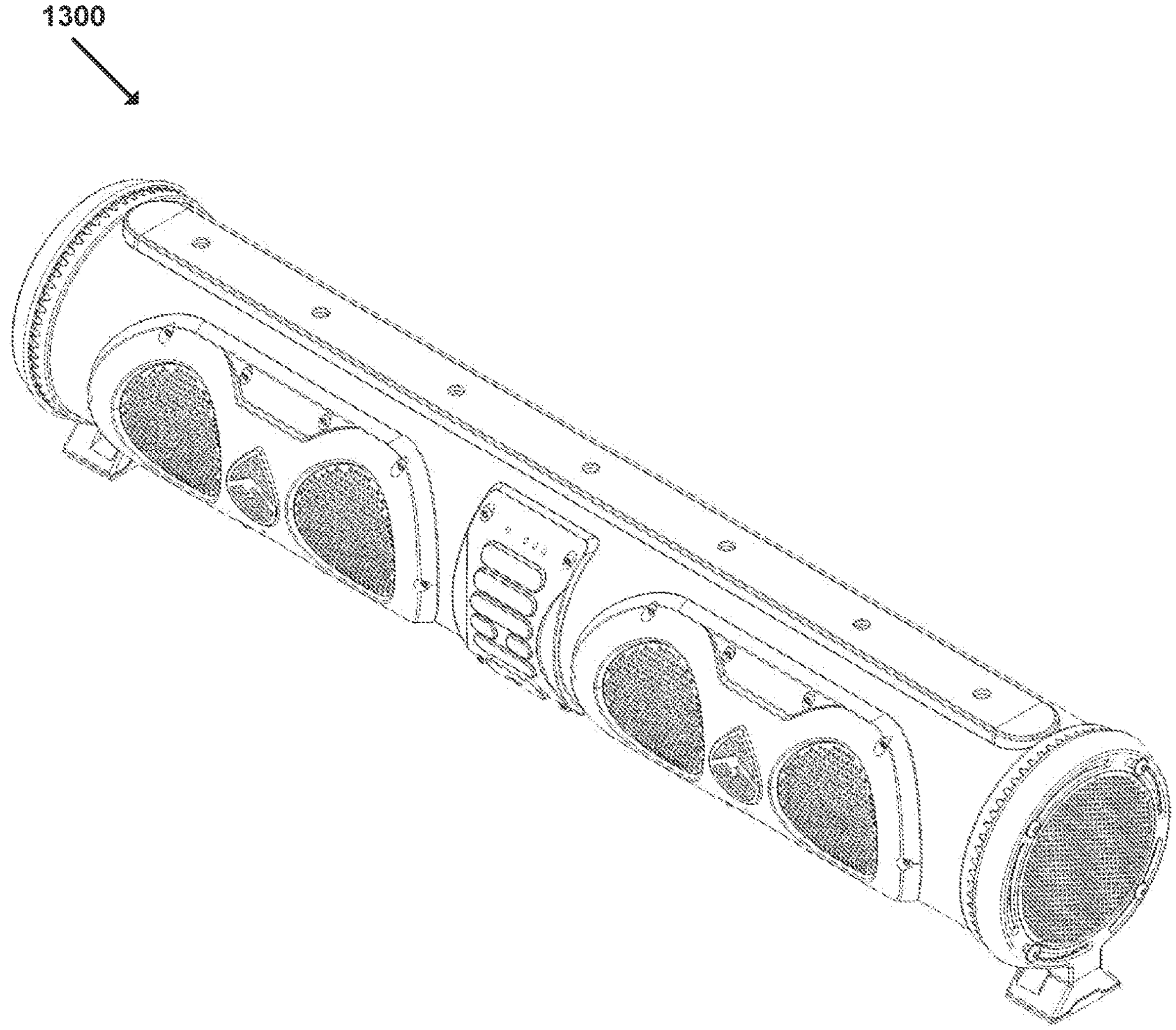
FIG. 17 illustrates a front-top-right-side perspective view of the self-powered mountable speaker bar of FIG. 13.
Figure 18:
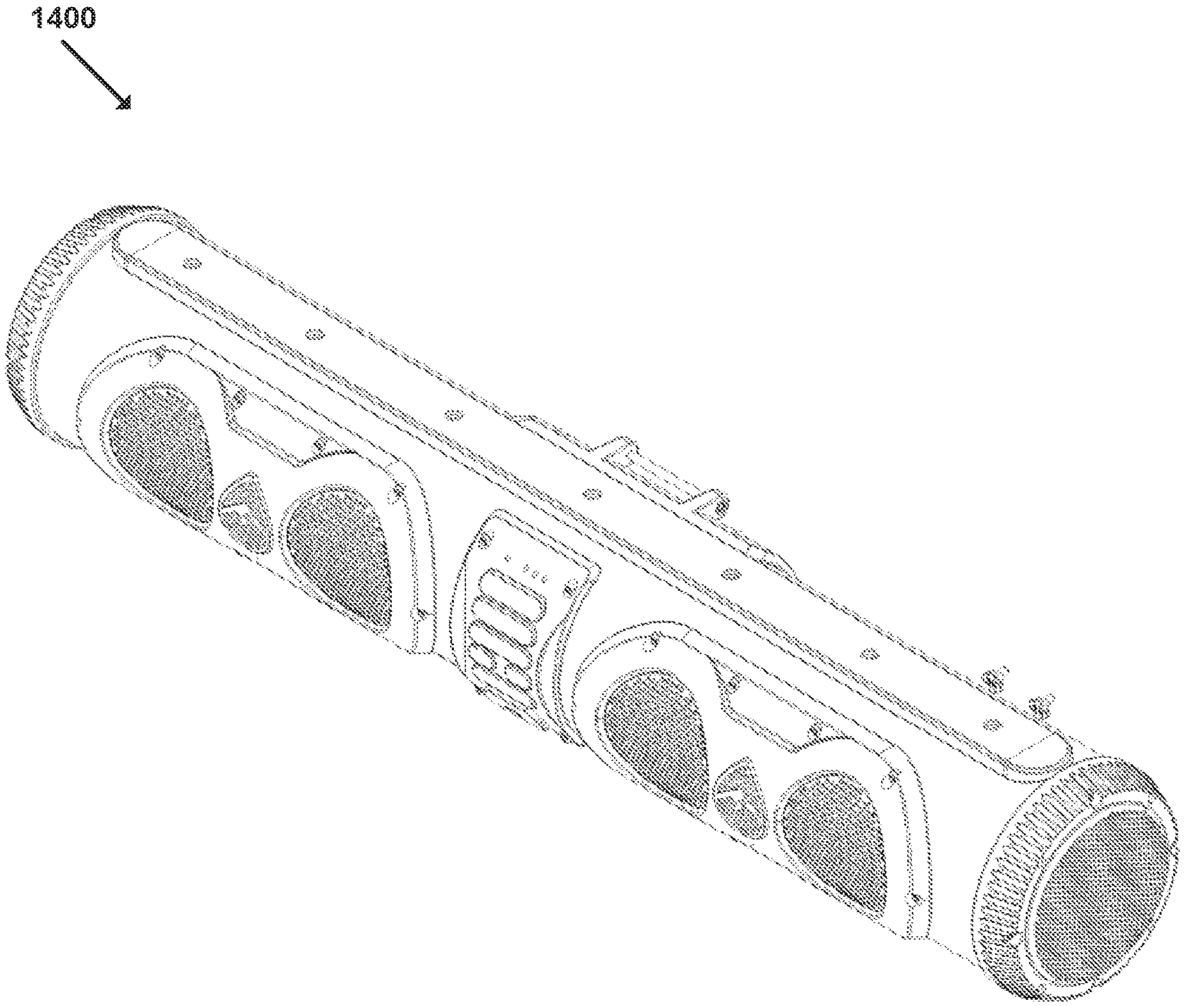
FIG. 18 illustrates a front-top-right-side perspective view of the self-powered mountable speaker bar of FIG. 14B.
Figure 19:
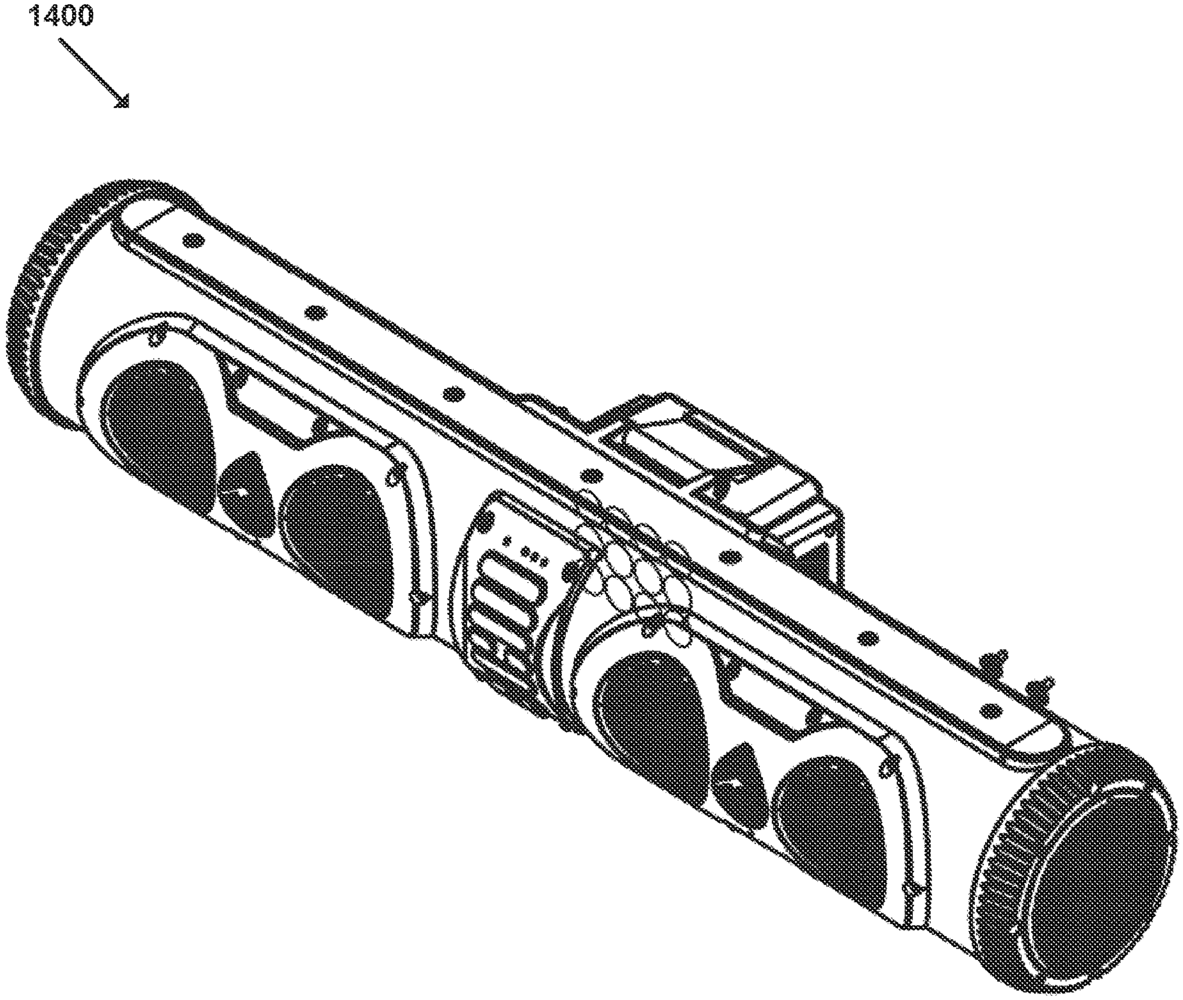
FIG. 19 illustrates a front-top-right-side perspective view of the self-powered mountable speaker bar of FIG. 14B with the removable battery pack installed.

FIG. 13 illustrates a front elevation view of an exemplary self-powered mountable speaker bar 1300 of some embodiments. FIG. 14A illustrates a rear elevation view of the exemplary self-powered mountable speaker bar 1300. FIG. 14B illustrates a rear elevation view of an alternative exemplary self-powered mountable speaker bar 1400 including a receptacle 1410 for a removable battery pack. FIG. 14C illustrates a rear elevation view of the alternative exemplary self-powered mountable speaker bar 1400 with a removable battery pack 1420 installed. FIG. 15A illustrates a top plan view of the exemplary self-powered mountable speaker bar 1300. FIG. 15B illustrates a top plan view of the alternative exemplary self-powered mountable speaker bar 1400. FIG. 15C illustrates a top plan view of the alternative exemplary self-powered mountable speaker bar 1400 with the removable battery pack installed. FIG. 16A illustrates a bottom plan view of the exemplary self-powered mountable speaker bar 1300. FIG. 16B illustrates a bottom plan view of the alternative exemplary self-powered mountable speaker bar 1400. FIG. 16C illustrates a bottom plan view of the alternative exemplary self-powered mountable speaker bar 1400 with the removable battery pack installed. FIG. 17 illustrates a front-top-right-side perspective view of the self-powered mountable speaker bar 1300. FIG. 18 illustrates a front-top-right-side perspective view of the self-powered mountable speaker bar 1400. FIG. 19 illustrates a front-top-right-side perspective view of the self-powered mountable speaker bar 1400 with the removable battery pack installed.

Self-powered mountable speaker bar 1300 and self-powered mountable speaker bar 1400 may be similar to self-powered mountable speaker bar 100. In this example, self-powered mountable speaker bar 1300 may include a non-removable or internal battery pack (not shown). Such a battery pack may be recharged via a connection port (e.g., a USB port), local power source (e.g., a solar cell included at the self-powered mountable speaker bar 1300), and/or other appropriate ways. Further, in this example, self-powered mountable speaker bar 1400 does not include mounting features 130. Mounting features similar to mounting features 130 may be included at, or added to, self-powered mountable speaker bar 1400. Additional and/or alternative mounting features may be included and/or used.

Figure 20:
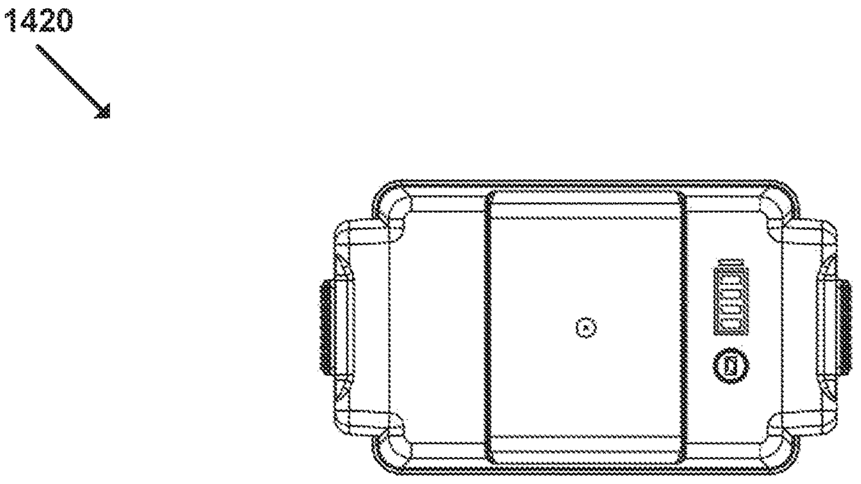
FIG. 20 illustrates a rear elevation view of a removable battery pack for the self-powered mountable speaker bar of FIG. 14B.
Figure 21:
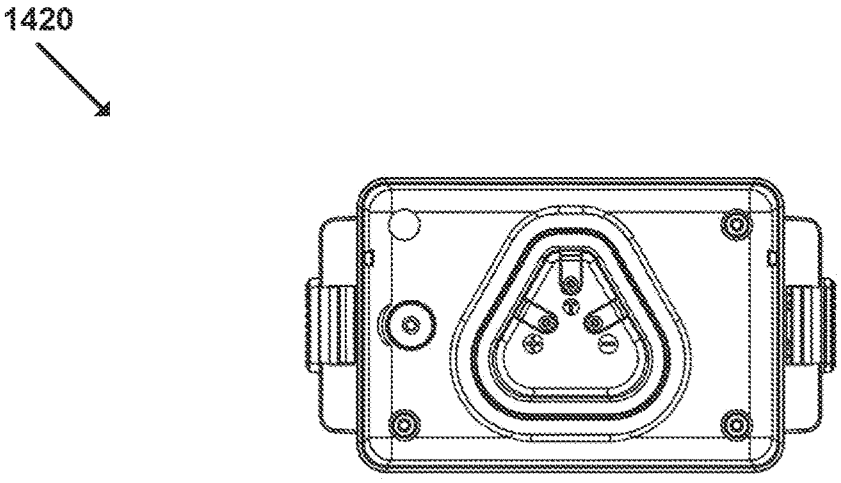
FIG. 21 illustrates a front elevation view of the removable battery pack of FIG. 20.
Figure 22:
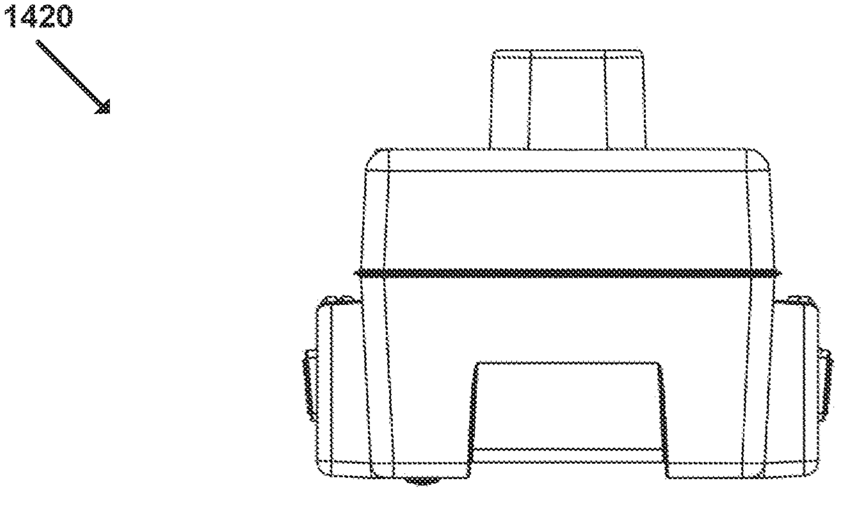
FIG. 22 illustrates a top plan view of the removable battery pack of FIG. 20.
Figure 23:
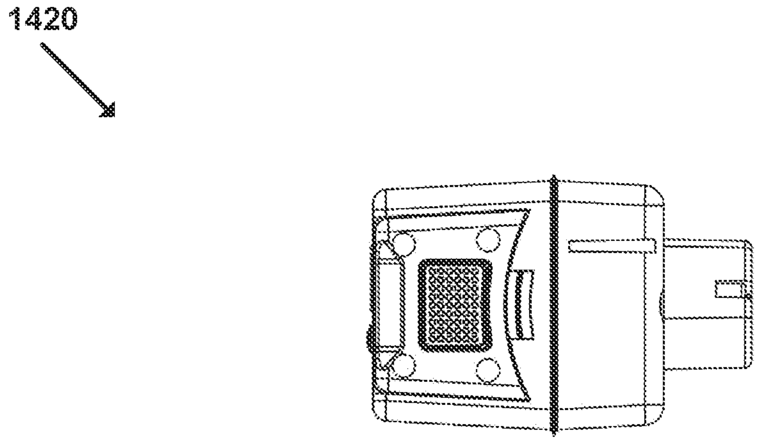
FIG. 23 illustrates a right-side elevation view of the removable battery pack of FIG. 20.
Figure 24:
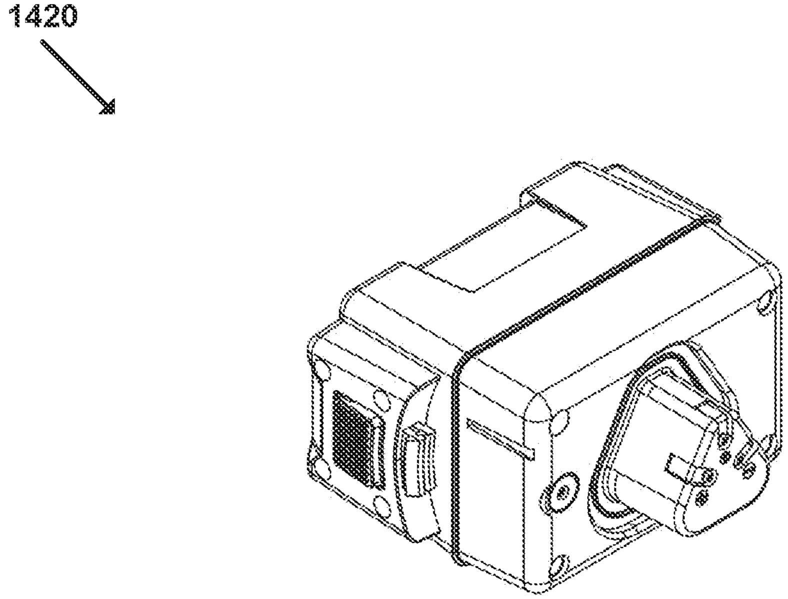
FIG. 24 illustrates a front-top-left-side perspective view of the removable battery pack of FIG. 20.

FIG. 20 illustrates a rear elevation view of a removable battery pack 1420 for the self-powered mountable speaker bar 1400. FIG. 21 illustrates a front elevation view of the removable battery pack 1420. FIG. 22 illustrates a top plan view of the removable battery pack 1420. FIG. 23 illustrates a right-side elevation view of the removable battery pack 1420. FIG. 24 illustrates a front-top-left-side perspective view of the removable battery pack 1420.

The battery pack 1420 may be similar to battery pack 400 described above. Receptacle 1410 may be able to receive a portion of the battery pack 1420 and may include power couplings that are complementary to power couplings included at the battery pack 1420.

Self-powered mountable speaker bars 1300 and 1400 (and battery pack 1420) are presented for exemplary purposes and one of ordinary skill in the art will recognize that other embodiments of the self-powered mountable speaker bar may include various different arrangements of components (e.g., UI features, speakers, mounting features, etc.) than shown. Similarly, different embodiments of the self-powered mountable speaker bar may be differently shaped, sized, and/or otherwise configured than shown, depending on various relevant factors, such as intended usage environment, desired output power, etc.

Figure 25:
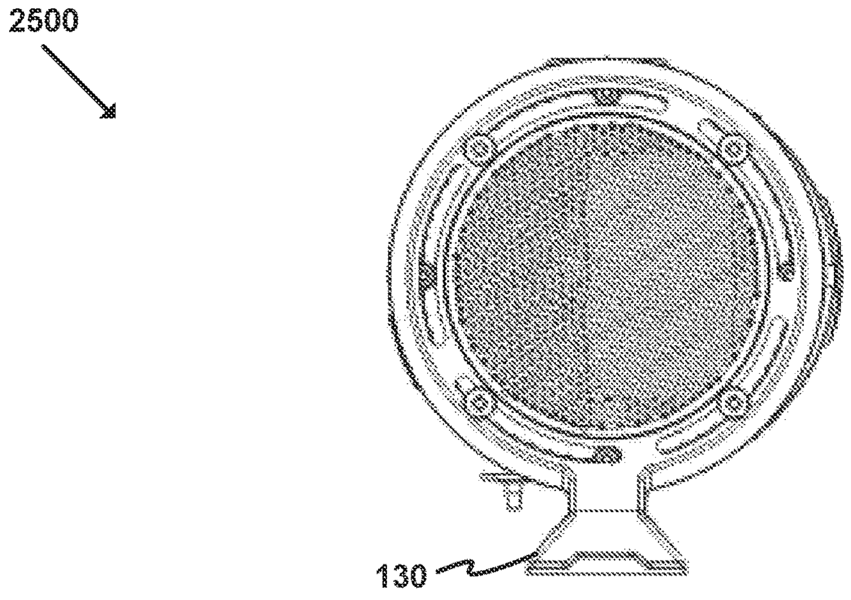
FIG. 25 illustrates a front elevation view of an end cap included with some embodiments of the exemplary self-powered mountable speaker bar of FIG. 13.
Figure 26:
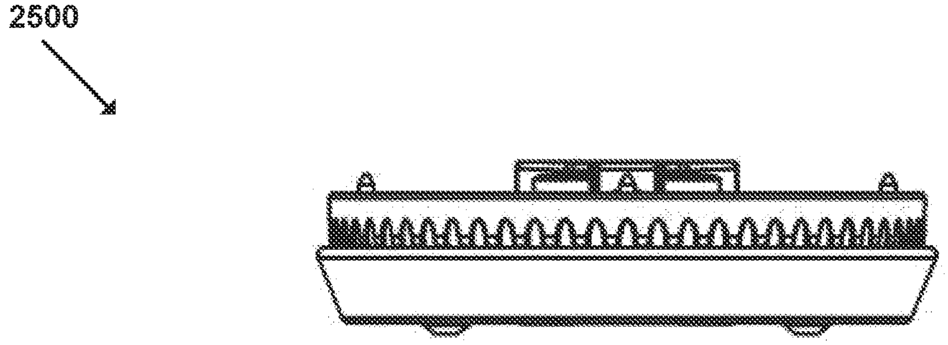
FIG. 26 illustrates a top plan view of the end cap of FIG. 25.
Figure 27:
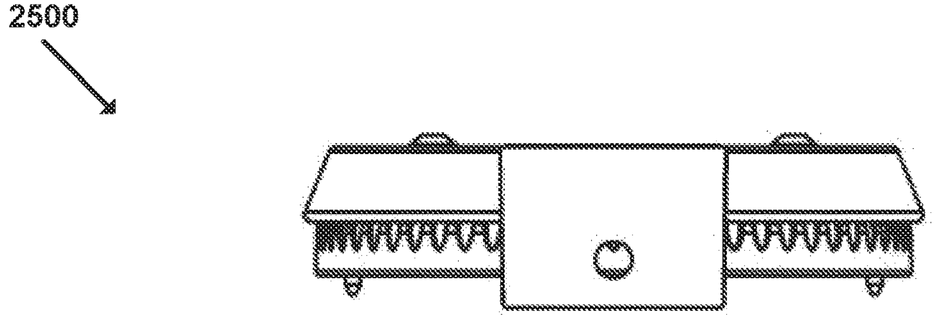
FIG. 27 illustrates a bottom plan view of the end cap of FIG. 25.
Figure 28:
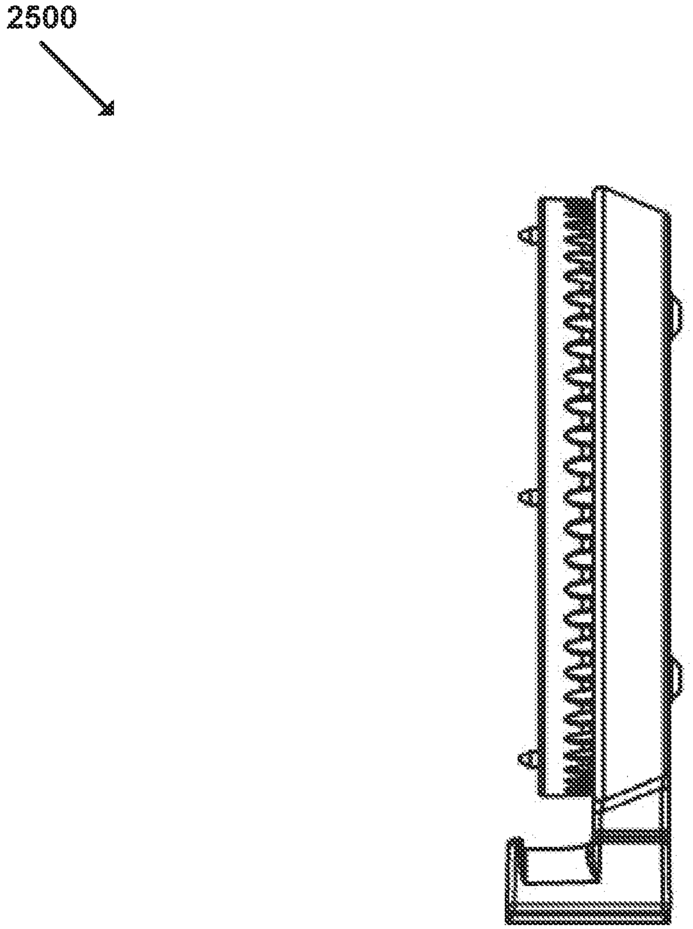
FIG. 28 illustrates a left-side elevation view of the end cap of FIG. 25.
Figure 29:
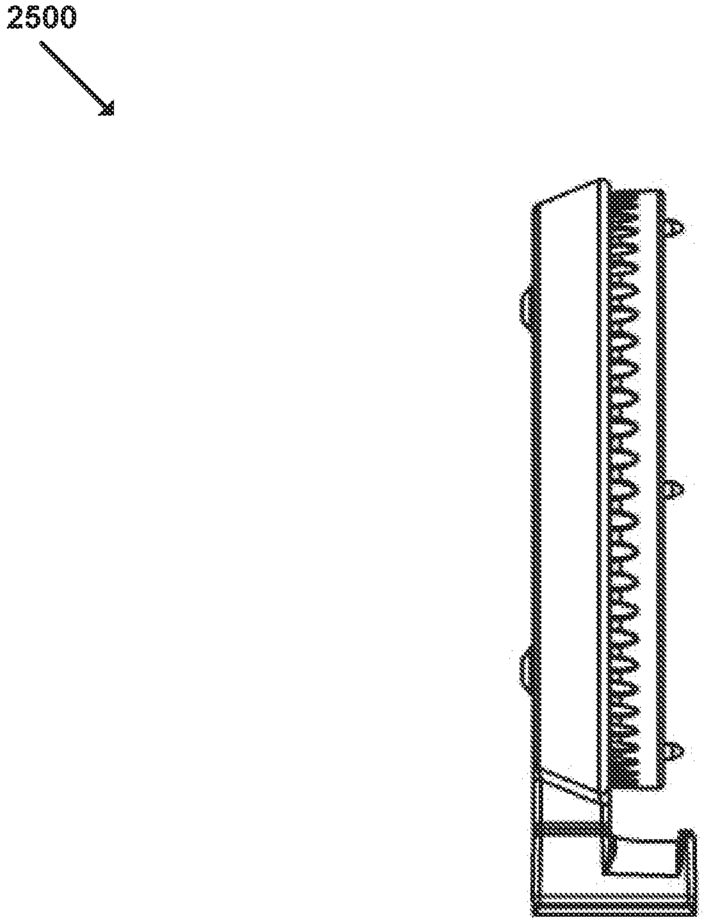
FIG. 29 illustrates a right-side elevation view of the end cap of FIG. 25.
Figure 30:
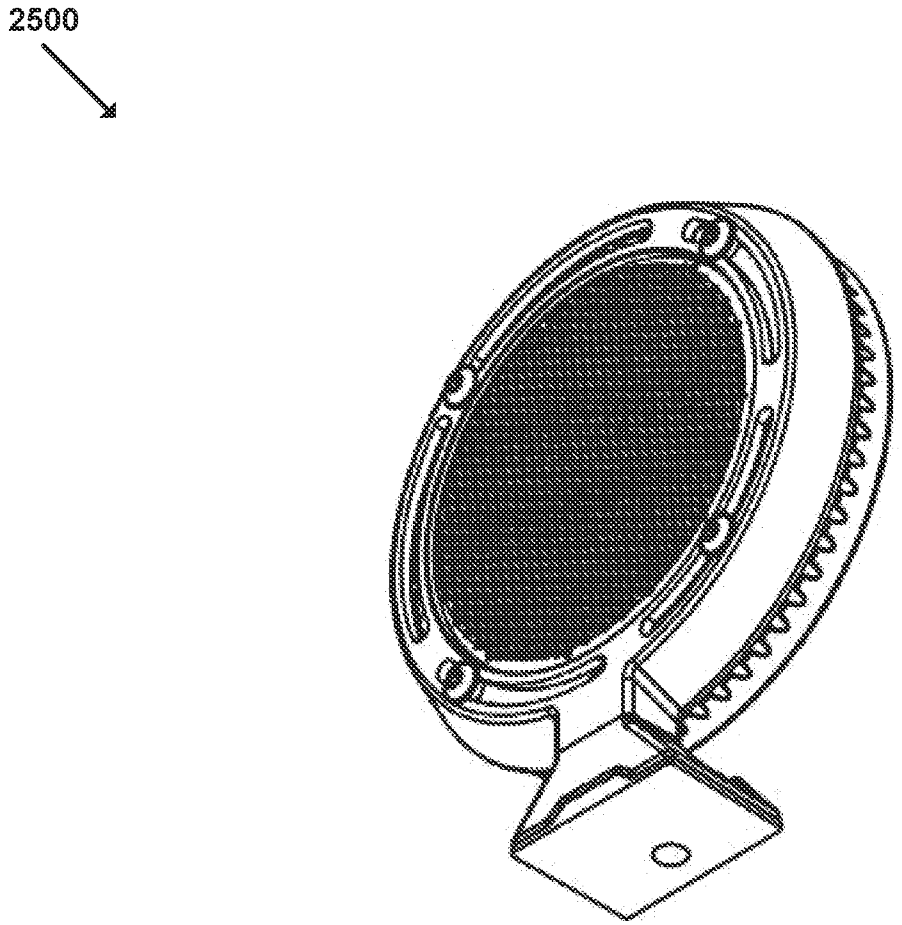
FIG. 30 illustrates a front-bottom-right-side perspective view of for the end cap of FIG. 25.
Figure 31:
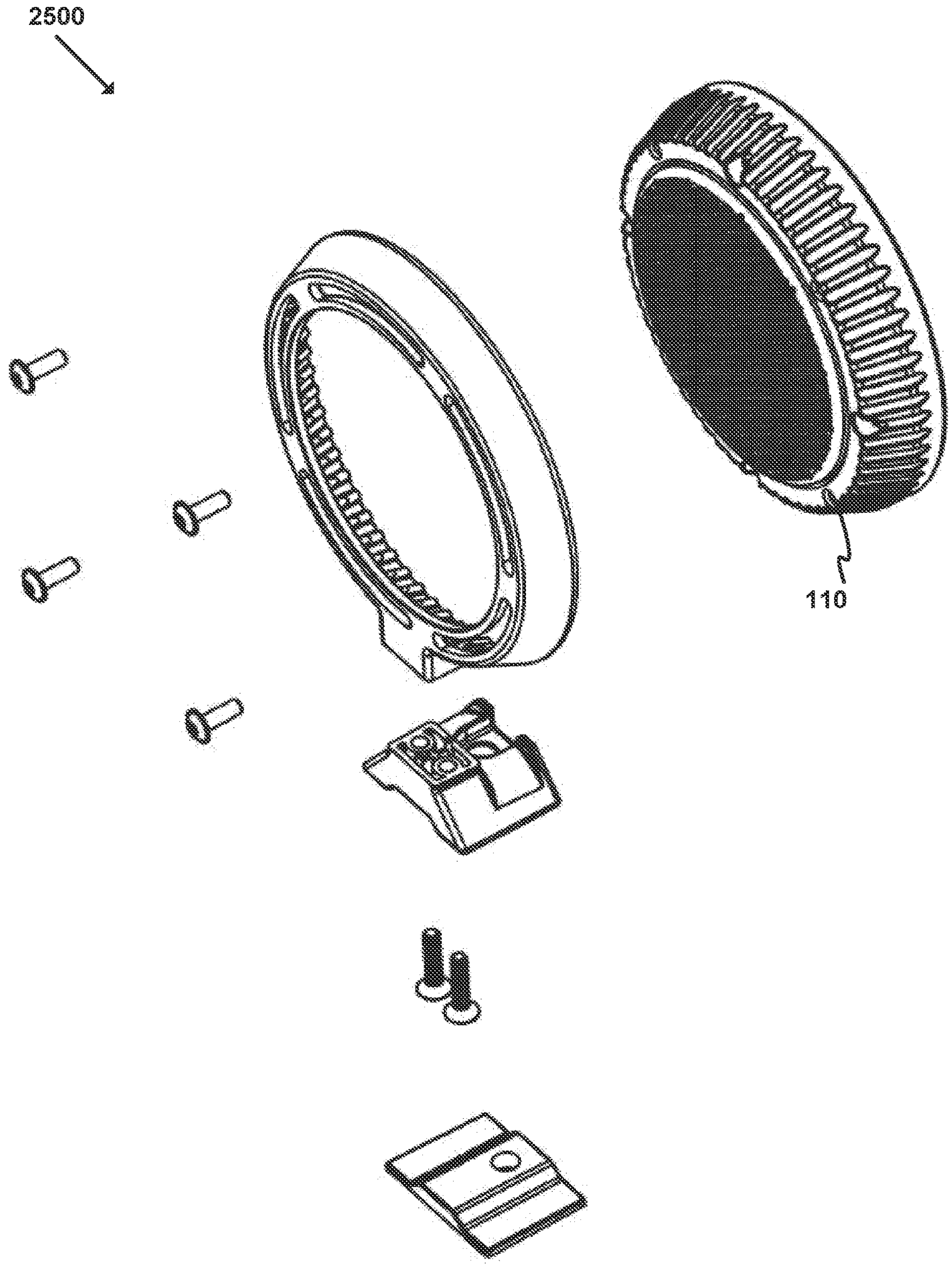
FIG. 31 illustrates an exploded view of the end cap of FIG. 25.

FIG. 25 illustrates a front elevation view of an end cap 2500 included with some embodiments of the exemplary self-powered mountable speaker bar 1300. FIG. 26 illustrates a top plan view of the end cap 2500. FIG. 27 illustrates a bottom plan view of the end cap 2500. FIG. 28 illustrates a side elevation view of the end cap 2500. FIG. 29 illustrates a side elevation view of the end cap 2500. FIG. 30 illustrates a front-bottom perspective view of for the end cap 2500. FIG. 31 illustrates an exploded view of the end cap 2500.

As shown, end cap 2500 may include mounting feature 130. The end cap 2500 may be coupled to a portion of housing 110 as shown in FIG. 31, and/or to other appropriate components of the self-powered mountable speaker bar 1300 (e.g., an internal frame or support structure). Similarly, the end cap 2500 may be coupled to a support as described in reference to FIG. 8 and/or FIG. 9. In some embodiments, the end cap 2500 may be coupled to a rotating or otherwise configurable mount, such that the self-powered mountable speaker bar 100, 1300, and/or 1400 may be positioned or repositioned for use under different operating conditions (e.g., by aiming the speakers toward a vehicle cabin when in motion and aiming the speakers away from the cabin or vehicle when stationary).

In some embodiments, each end cap 2500 may include one or more speakers or other audio outputs (e.g., a passive subwoofer port).

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 32:
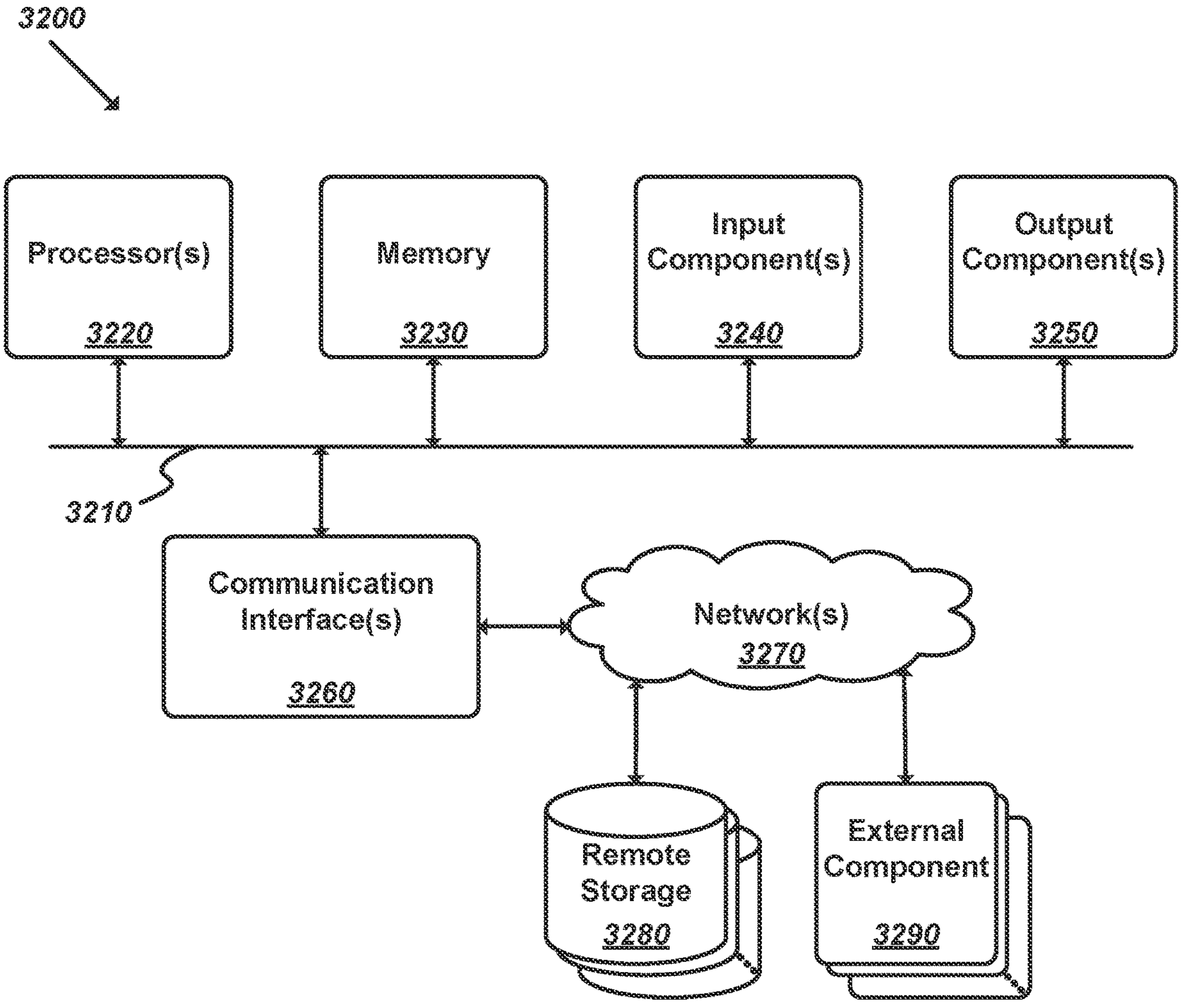
FIG. 32 illustrates a schematic block diagram of one or more exemplary devices used to implement various embodiments.

FIG. 32 illustrates a schematic block diagram of an exemplary device (or system or devices) 3200 used to implement some embodiments. For example, the systems, environments, and/or devices described above in reference to FIG. 2 and FIG. 3 may be at least partially implemented using device 3200. As still another example, the processes described in reference to FIG. 10, FIG. 11, and FIG. 12 may be at least partially implemented using device 3200.

Device 3200 may be implemented using various appropriate elements and/or sub-devices. For instance, device 3200 may be implemented using one or more personal computers (PCs), servers, user devices (e.g., smartphones), tablet devices, wearable devices, and/or any other appropriate devices. The various devices may work alone (e.g., device 3200 may be implemented as a single smartphone) or in conjunction (e.g., some components of the device 3200 may be provided by a user device while other components are provided by a server).

As shown, device 3200 may include at least one communication bus 3210, one or more processors 3220, memory 3230, input components 3240, output components 3250, and one or more communication interfaces 3260.

Bus 3210 may include various communication pathways that allow communication among the components of device 3200. Processor 3220 may include a processor, microprocessor, microcontroller, digital signal processor, logic circuitry, and/or other appropriate processing components that may be able to interpret and execute instructions and/or otherwise manipulate data. Memory 3230 may include dynamic and/or non-volatile memory structures and/or devices that may store data and/or instructions for use by other components of device 3200. Such a memory device 3230 may include space within a single physical memory device or spread across multiple physical memory devices.

Input components 3240 may include elements that allow a user to communicate information to the computer system and/or manipulate various operations of the system. The input components may include keyboards, cursor control devices, audio input devices and/or video input devices, touchscreens, motion sensors, etc. Output components 3250 may include displays, touchscreens, audio elements such as speakers, indicators such as light-emitting diodes (LEDs), printers, haptic or other sensory elements, etc. Some or all of the input and/or output components may be wirelessly or optically connected to the device 3200.

Device 3200 may include one or more communication interfaces 3260 that are able to connect to one or more networks 3270 or other communication pathways. For example, device 3200 may be coupled to a web server on the Internet such that a web browser executing on device 3200 may interact with the web server as a user interacts with an interface that operates in the web browser. Device 3200 may be able to access one or more remote storages 3280 and one or more external components 3290 through the communication interface 3260 and network 3270. The communication interface(s) 3260 may include one or more application programming interfaces (APIs) that may allow the device 3200 to access remote systems and/or storages and also may allow remote systems and/or storages to access device 3200 (or elements thereof).

It should be recognized by one of ordinary skill in the art that any or all of the components of computer system 3200 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 3200 may perform various operations in response to processor 3220 executing software instructions stored in a computer-readable medium, such as memory 3230. Such operations may include manipulations of the output components 3250 (e.g., display of information, haptic feedback, audio outputs, etc.), communication interface 3260 (e.g., establishing a communication channel with another device or component, sending and/or receiving sets of messages, etc.), and/or other components of device 3200.

The software instructions may be read into memory 3230 from another computer-readable medium or from another device. The software instructions stored in memory 3230 may cause processor 3220 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

The invention claimed is:

1. A media playback device comprising:
- a cylindrical housing;
- a set of mounting features coupled to the cylindrical housing,
  - wherein each mounting feature in the set of mounting features comprises an L-shaped member having a clamp receptacle with a curved clamp engagement surface and a clamp retention element that allow the cylindrical housing to be coupled to a tubular support via a hose clamp,
  - wherein the clamp retention element comprises a protruding lip, and
  - wherein the set of mounting features comprises a first mounting feature located at a first distal end of the cylindrical housing and a second mounting feature located at a second distal end of the cylindrical housing;
- a rechargeable battery pack coupled to the cylindrical housing;
- an audio amplifier that receives power from the rechargeable battery pack and generates a plurality of audio outputs; and
- a plurality of speakers, each speaker in the plurality of speakers associated with at least one audio output from the plurality of audio outputs.

2. The media playback device of claim 1, wherein the rechargeable battery pack is able to be electrically coupled to a battery of an associated vehicle.

3. The media playback device of claim 1, wherein the rechargeable battery pack is able to be selectively coupled to and decoupled from the cylindrical housing via a set of coupling features and wherein the cylindrical housing comprises a coupling slot and the set of coupling features comprises a complementary spring-loaded protruding tab associated with the coupling slot.

4. The media playback device of claim 1 further comprising a wireless communication interface that receives media from a connected user device over a wireless communication channel and provides the received media to the audio amplifier.

5. A self-powered mountable speaker bar comprising:
- a cylindrical housing;
- a first end cap coupled to a first distal end of the cylindrical housing;
- a second end cap coupled to a second distal end of the cylindrical housing;
- a set of mounting features coupled to the cylindrical housing,
  - wherein each mounting feature in the set of mounting features comprises an L-shaped member having a clamp receptacle with a curved clamp engagement surface and a clamp retention element that allow the cylindrical housing to be coupled to a tubular support via a hose clamp,
  - wherein the clamp retention element comprises a protruding lip, and
  - wherein the set of mounting features comprises a first mounting feature coupled to the first end cap and a second mounting feature coupled to the second end cap;
- a plurality of speakers distributed along a length of the cylindrical housing; and
- a rechargeable battery pack coupled to the cylindrical housing.

6. The self-powered mountable speaker bar of claim 5, wherein the rechargeable battery pack is able to be electrically coupled to a battery of an associated vehicle.

7. The self-powered mountable speaker bar of claim 5, wherein the rechargeable battery pack is able to be selectively coupled to and decoupled from the cylindrical housing via a set of coupling features and wherein the set of coupling features comprises a set of spring-loaded extending tabs.

8. The self-powered mountable speaker bar of claim 5 further comprising a wireless communication interface that receives media from a connected user device over a wireless communication channel.

9. The self-powered mountable speaker bar of claim 5 further comprising a set of user interface features including at least one button or at least one indicator.

10. The self-powered mountable speaker bar of claim 5, wherein the cylindrical housing is waterproof.

11. A media playback system comprising a media playback device that includes:
- a cylindrical housing;
- a set of mounting features coupled to the cylindrical housing,
  - wherein each mounting feature in the set of mounting features comprises an L-shaped member having a clamp receptacle with a curved clamp engagement surface and a clamp retention element that allow the cylindrical housing to be coupled to a tubular support via a hose clamp, wherein the clamp retention element comprises a protruding lip, and wherein the set of mounting features comprises a first mounting feature located at a first distal end of the cylindrical housing and a second mounting feature located at a second distal end of the cylindrical housing;

a rechargeable battery pack coupled to the cylindrical housing;

an audio amplifier that receives power from the rechargeable battery pack and generates a plurality of audio outputs;

a plurality of speakers, each speaker in the plurality of speakers associated with at least one audio output from the plurality of audio outputs; and a wireless communication interface that receives media from a connected user device over a wireless communication channel and provides the received media to the audio amplifier.

12. The media playback system of claim 11, wherein the rechargeable battery pack is able to be electrically coupled to a battery of an associated vehicle.

13. The media playback system of claim 11, wherein the rechargeable battery pack is able to be selectively coupled to and decoupled from the cylindrical housing via a set of coupling features and wherein the cylindrical housing comprises a coupling slot and the set of coupling features comprises a complementary spring-loaded protruding tab associated with the coupling slot.

* * * * *